United States Patent
Hayashi et al.

(10) Patent No.: US 6,178,145 B1
(45) Date of Patent: Jan. 23, 2001

(54) FOCUS SERVO CONTROL SYSTEM AND DISK REPRODUCING SYSTEM

(75) Inventors: Yasuhiro Hayashi, Yokohama; Masayuki Tamura, Fukaya; Satoru Maeda, Kodama-gun, all of (JP)

(73) Assignee: Kabushiki Kaisha Toshiba, Kawasaki (JP)

(*) Notice: Under 35 U.S.C. 154(b), the term of this patent shall be extended for 0 days.

(21) Appl. No.: 09/199,784

(22) Filed: Nov. 25, 1998

(30) Foreign Application Priority Data

Nov. 26, 1997 (JP) .................................................... 9-339468
Dec. 29, 1997 (JP) .................................................... 9-367520

(51) Int. Cl.$^7$ ............................................ G11B 7/09
(52) U.S. Cl. .................................... 369/44.29; 369/44.25; 369/44.34; 250/201.5
(58) Field of Search ............................ 369/44.25, 44.26, 369/44.27, 44.28, 44.29, 44.32, 44.34, 44.35, 47, 54, 58, 93, 94, 112; 250/201.5

(56) References Cited

U.S. PATENT DOCUMENTS

| | | | |
|---|---|---|---|
| 5,282,184 | * | 1/1994 | Takikita ............................ 369/44.25 |
| 5,610,886 | | 3/1997 | Hayashi et al. . |
| 6,011,762 | * | 1/2000 | Watanabe et al. ................. 369/44.27 |
| 6,061,310 | * | 5/2000 | Iida .................................... 369/44.27 |

FOREIGN PATENT DOCUMENTS 8-147715   6/1996   (JP) .

* cited by examiner

Primary Examiner—Muhammad Edun
(74) Attorney, Agent, or Firm—Oblon, Spivak, McClelland, Maier & Neustadt, P.C.

(57) ABSTRACT

A focus servo control system is a system for selectively applying a light beam to a disk on which data is recorded on plurally layered recording surfaces and setting the focus position of the light beam on a selected recording surface of the two-layered recording surfaces based on a signal read from reflected light from the selected recording surface of the plurally layered recording surfaces of the disk and includes a focus error detector for detecting a positional difference between the focus position of the light beam and the selected recording surface of the plurally layered recording surfaces, a sample-hold circuit for sampling and holding an output of the focus error detector, a focus position correcting circuit for correcting the focus position of the light beam based on one of the output of the focus error detector and an output of the sample-hold circuit, a data signal level detector for detecting the signal level relating to data read out from the disk, a comparator for comparing a signal level detected by the data signal level detector with a predetermined level to output the result of comparison, and a selector for selecting one of the output of the focus error detector and the output of the sample-hold circuit as an input signal of the focus position correcting circuit based on the output of the comparator.

20 Claims, 16 Drawing Sheets

FOCUS SERVO CONTROL SYSTEM AND DISK REPRODUCING SYSTEM

BACKGROUND OF THE INVENTION

This invention relates to a disk reproducing system such as a CD player, CD-ROM, DVD-ROM, and more particularly to a focus servo control circuit used in a DVD system.

A disk reproducing system used in an audio/visual device or computer peripheral device is constructed as shown by a system diagram of FIG. 1. A beam emitted from a laser pickup (PU) 12 is applied to a pit string on a disk 11 rotated by a disk motor 13 and a beam reflected therefrom is converted into an electrical signal (RF signal) by use of an optical element such as a photodiode to obtain pit data. The converted RF signal is amplified by an RF amplifier 15. The amplified RF signal is binary-coded into a digital signal and then supplied to a PLL (Phase Lock Loop) circuit in a data extraction circuit 26.

In the PLL circuit, a bit clock signal extracted with a data signal used as a reference is created. The data signal is processed together with the bit clock signal in a signal processing circuit 26. The signal processing circuit 26 is a circuit for receiving the data signal and effecting the processes of synchronization pattern detection, data demodulation, and error correction by use of a correction RAM 27 and video/audio data or computer data can be output to the exterior only after it is subjected to the above processes.

Referring to FIG. 1, a system associated with the focus servo control circuit is explained. A signal read out from the disk 11 by use of the pickup 12 is input to the RF amplifier (RF AMP) 15 and a tracking error signal TE, focus error signal FE and RF signal which is an information signal are derived from the RF amplifier 15.

The tracking error signal TE is input to a tracking servo control circuit 16, the gain and phase thereof are compensated for and the seek control or the like is effected. An output signal of the tracking servo control circuit 16 is input to an actuator driver 19 to drive the tracking actuator of the pickup 12. Further, an output signal of an output equalizer of the tracking servo control circuit 16 is also supplied to a feed motor control circuit 17 to drive a feed motor 14 via a motor driver 18.

The focus error signal FE is input to a focus servo equalizer 21 via a servo ON/OFF switch 20. An output signal of the focus servo equalizer 21 is added to a generation signal of a lens drive signal generating circuit 23 and the result of addition is supplied to a focus actuator driver 22. Then, it is supplied to drive the focus actuator of the pickup 12.

The RF signal is supplied to a data extraction circuit and CD/DVD data signal processing circuit 26, binary-coded in the data extraction circuit, then demodulated after a bit clock and synchronizing signal are extracted, and subjected to the correction process by use of the correction RAM 27. The synchronizing signal is supplied to a disk motor control circuit 24 to control a disk motor 13 via a disk motor driver 25.

Data corrected in the data signal processing circuit 26 is supplied to an MPEG video/audio decoder processing circuit 28 in the case of DVD movie and a video signal or audio signal is output from the circuit. In the case of DVD-ROM, output data from the data signal processing circuit 26 is supplied to a data buffer circuit 28 and data is output therefrom as digital data to a host personal computer or the like. A system controller 29 controls the control timings of the various control circuits and the operation of the whole set.

FIG. 2 is a timing diagram showing the movement of a beam spot (lens) and the movement of various signals at the time of movement between layers (which is hereinafter referred to as layer jump). In FIG. 2, D indicates a distance between the first and second layers and is approx. 55 $\mu$m, for example, in the case of DVD system. (A) indicates a case wherein the direction of the surface deviation of the disk is the same as the moving direction (upward direction in this example) of the beam spot. The speed of the beam spot in the layer direction is relatively low with respect to the disk surface.

(B) and (C) indicate cases wherein the direction of the surface deviation of the disk is opposite to the moving direction (downward direction in this example) of the beam spot. The speed of the beam spot in the layer direction is relatively high with respect to the disk surface.

Thus, since the moving speed condition of the beam spot is changed depending on the position even on the same disk, the layer jump may fail sometimes when the focus servo is turned ON again on the layer of the destination. In FIG. 2, (A) and (B) show the successful case and (C) shows the failure case. In the case of (C), the beam spot is separated from the layer of the destination.

However, the layer jump operation of the focus servo is an extremely important operation in the DVD system, and since only two layers are provided, it cannot be settled on the other layer in the case of failure of the layer jump unlike the track jump of the tracking servo. As a result, the result of failure becomes serious. Further, in the case of failure, since the central control unit is required to restore the servo to the initial state and effect the operation starting from the focus search, it takes a long time to recover the operating state. Whether the phenomenon occurs or not is determined by the surface deviation distance and rotation speed.

From the above points, it is desired to enhance the accuracy of the layer jump operation.

BRIEF SUMMARY OF THE INVENTION

A first object of this invention is to provide a disk reproducing system and a focus servo control system of a DVD system capable of forcedly holding a focus error signal and forcedly returning a beam spot to the target layer even in the case of failure of the layer jump in order to enhance the reliability when the beam spot is layer-jumped between plural layers.

A second object of this invention is to provide a disk reproducing system and a focus servo control system of a DVD system capable of attaining stable layer jump by applying the brake before the actual focus position even in a case wherein the relative speed of a beam spot and a disk is largely changed when the disk having large surface deviation is used.

In order to attain the first object, a focus control system according to a first aspect of this invention which is a focus servo control system for selectively applying a light beam to a disk on which data is recorded on plurally layered recording surfaces and focusing a focus position of the light beam on a selected one of the plurally layered recording surfaces based on a signal read from reflected light from the selected one of the plurally layered recording surfaces of the disk, comprises a focus error detector for detecting a positional difference between the focus position of the light beam and the selected one of the plurally layered recording surfaces;

a sample-hold circuit for sampling and holding an output of the focus error detector; a focus position correcting circuit for correcting the focus position of the light beam based on one of the output of the focus error detector and an output of the sample-hold circuit; a data signal level detector for detecting a signal level relating to data read out from the disk; a first comparator for comparing the signal detected by the data signal level detector with a predetermined level to output a result of comparison; and a selector for selecting one of the output of the focus error detector and the output of the sample-hold circuit as an input signal of the focus position correcting circuit based on the output of the first comparator.

A disk reproducing system according to a second aspect of this invention which is a disk reproducing system for selectively applying a light beam to a disk on which data is recorded on plurally layered recording surfaces and reproducing the data based on a signal read from reflected light from a selected one of the plurally layered recording surfaces of the disk, comprises a pickup for reading the reflected light; a focus error detector for detecting a positional difference on a basis of the reflected light read by the pickup between a focus position of the light beam and the selected one of the plurally layered recording surfaces; a sample-hold circuit for sampling and holding an output of the focus error detector; a focus position correcting circuit for correcting the focus position of the light beam based on one of the output of the focus error detector and an output of the sample-hold circuit; a data signal level detector for detecting a signal level relating to data read out from the disk; a first comparator for comparing the signal level detected by the data signal level detector with a predetermined level to output a result of comparison; and a selector for selecting one of the output of the focus error detector and the output of the sample-hold circuit as an input signal of the focus position correcting circuit based on the output of the first comparator.

In the above focus servo control system or the disk reproducing system, the following construction is preferably provided.

A timer circuit for setting a sample hold operation of the sample-hold circuit active for a preset period of time is further provided.

A control circuit for causing a start of the operation of the timer circuit and a start of an operation of the focus position correcting circuit to substantially coincide with each other is further provided.

The second comparator is further provided to compare an absolute value of the output of the focus error detector with an absolute value of the output of the sample-hold circuit, and the selector selects the output of the sample-hold circuit when the absolute value of the output of the sample-hold circuit is larger than the absolute value of the output of the focus error detector.

A correction signal generating circuit for generating a correction signal having an absolute value smaller than the absolute value of the output of the sample-hold circuit as the input signal of the focus position correcting circuit is further provided and, in a case where the focus position of the light beam jumps from one recording surface to the another recording surface of the plurally layered recording surfaces, the output of the focus error detector to the focus position correcting circuit is input in an initial stage of an overshooting period in which the focus position of the light beam passes through the another recording surface, the output of the sample-hold circuit to the focus position correcting circuit is input in an intermediate stage of the overshooting period in which the focus position of the light beam overshoots the another recording surface, and the output of the correction signal generating circuit to the focus position correcting circuit is input in a final stage of the overshooting period in which the focus position of the light beam enters the another recording surface again.

Generally, at the time of movement between layers (which is hereinafter referred to as layer jump), the relative speed of the beam spot and the pit surface of the disk is different at each time of the layer jump by the surface deviation caused by the disk rotation. For this reason, it is understood that it is difficult to effect the stable layer jump in every position during the rotation of the disk, but in this invention, the beam spot can be forcedly returned to the target layer even if the layer jump is unsuccessful.

In order to attain the second object, a focus control system according to a third aspect of this invention which is a focus servo control system for selectively applying a light beam to a disk on which data is recorded on plurally layered recording surfaces and focusing a focus position of the light beam on a selected one of the recording surfaces based on a signal read from reflected light from the selected one of the plurally layered recording surfaces of the disk, comprises a focus error detector for detecting a positional difference between the focus position of the light beam and the selected one of the plurally layered recording surfaces; a focus position correcting circuit for correcting the focus position of the light beam based on an output of the focus error detector; a system control circuit for controlling an operation of the focus position correcting circuit; a differentiating circuit for outputting a high frequency component of the output of the focus error detector; a comparator for comparing a level of the output of the focus error detector with a predetermined level to output an activation signal when the level of the output of the focus error detector exceeds the predetermined level; a jump signal generating circuit controlled by the system control circuit, for generating a control signal for jumping the focus position of the light beam from one of the plurally layered recording surfaces to another of the recording surfaces; a selector for selecting and outputting one of an output of the differentiating circuit and an output of the jump signal generating circuit based on an output of the comparator; and an adder for adding an output of the selector to an output of the focus position correcting circuit.

In order to attain the second object, a disk reproducing system according to a fourth aspect of this invention which is a disk reproducing system for selectively applying a light beam to a disk on which data is recorded on plurally layered recording surfaces and reproducing the data based on a signal read from reflected light from a selected one of the plurally layered recording surfaces of the disk, comprises a pickup for reading the reflected light; a focus error detector for detecting a positional difference on a basis of the reflected light read by the pickup between focus position of the light beam and the selected one of the plurally layered recording surfaces; a focus position correcting circuit for correcting the focus position of the light beam based on an output of the focus error detector; a system control circuit for controlling an operation of the focus position correcting circuit; a differentiating circuit for outputting a high frequency component of the output of the focus error detector; a comparator for comparing a level of the output of the focus error detector with a predetermined level to output an activation signal when the level of the output of the focus error detector exceeds the predetermined level; a jump signal generating circuit controlled by the system control circuit, for generating a control signal for jumping the focus position of the light beam from one of the plurally layered recording surfaces to another of recording surfaces; a selector for selecting and outputting one of an output of the differentiating circuit and an output of the jump signal generating circuit based on an output of the comparator; and an adder for adding an output of the selector to an output of the focus position correcting circuit.

In the focus servo control system of the third aspect or the disk reproducing system of the fourth aspect, the following construction is preferably provided.

An integrating circuit for outputting a low frequency component of the output of the focus error detector is further provided and the system control circuit switches the output of the focus error detector to an output of the integrating circuit as an input of the focus position correcting circuit and jumps the focus position of the light beam from the one of the plurally layered recording surfaces to the another of the recording surfaces by use of the control signal generated by the jump signal generating circuit, and, after the comparator outputs the activation signal, the output of the differentiating circuit is output to the adder, the system control circuits sets a position correcting operation of the focus position correcting circuit active when the polarity of the output of the differentiating circuit is inverted.

A mute circuit connected to an output side of the focus position correcting circuit, for interrupting the output of the focus position correcting circuit for a preset period of time after the polarity of the output of the differentiating circuit is inverted is further provided.

There is further provided a gate circuit connected to the comparator, for interrupting the output of the comparator for a preset period of time immediately after a jumping operation is started when the focus position jumps from the one of the two-layered recording surfaces to the another of the recording surfaces.

The jump signal generating circuit outputs the control signal for a preset period of time immediately after a jumping operation is started when the focus position jumps from the one of the plurally layered recording surfaces to the another of the recording surfaces.

In this invention, the brake is applied by use of a differential signal of the focus error signal at the time of layer jump, and then, the brake is applied before the actual focused position by turning ON the servo mechanism at the zero cross point. By applying the brake before the actual focused position, the movement of the beam spot is sufficiently decelerated, and as a result, the servo ON operation in the focused position can be stably effected.

Conventionally, since the relative speed of the beam spot and the pit surface of the disk is different at each time of the layer jump by the surface deviation caused by the disk rotation, it is understood that it is difficult to effect the stable layer jump in every position during the rotation of the disk, but in this invention, the reliability of the layer jump can be enhanced.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

There will now be described embodiments of this invention with reference to the accompanying drawings.

First Embodiment

Figure 1:
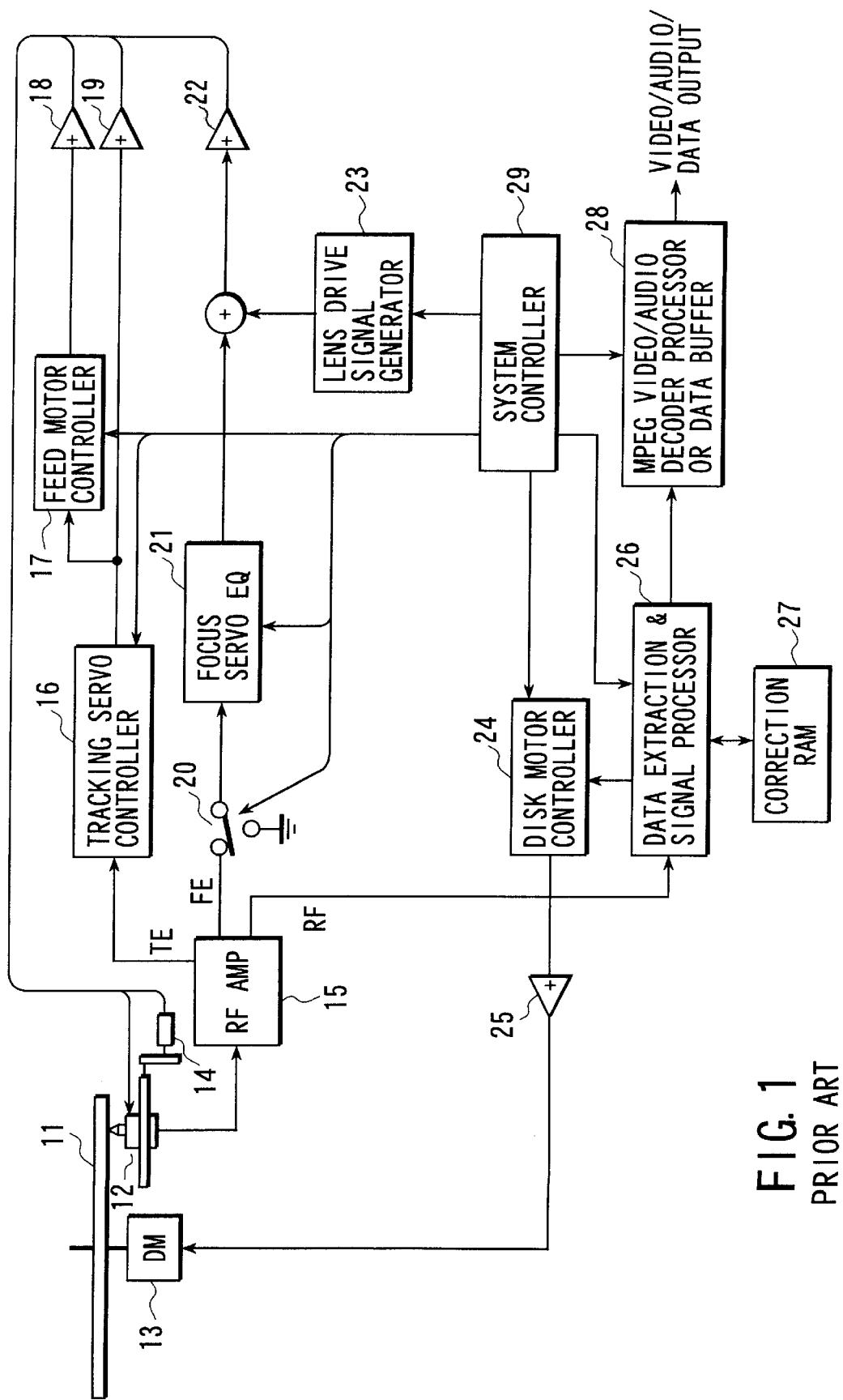
FIG. 1 is a block diagram showing a conventional DVD system.
Figure 2:
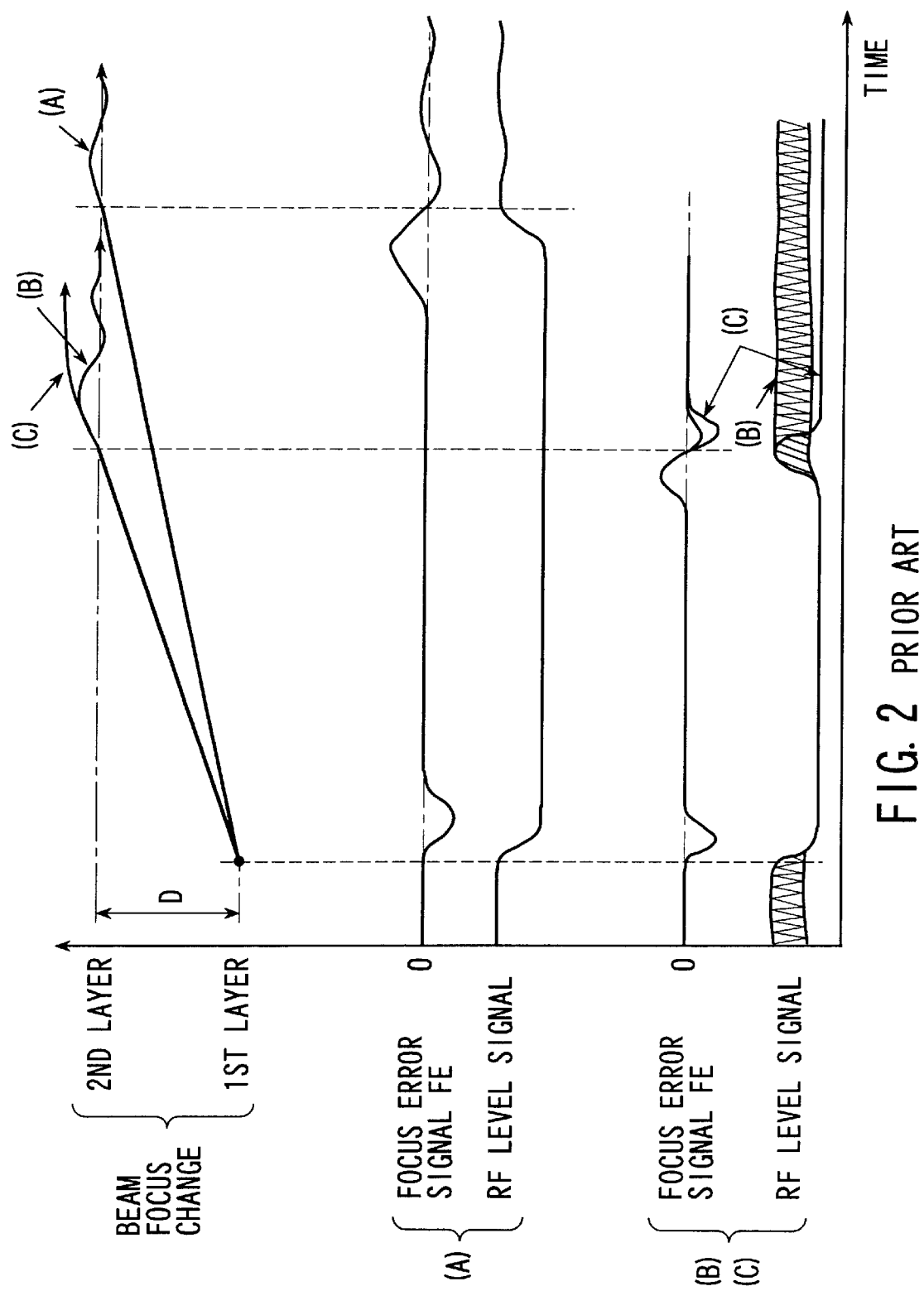
FIG. 2 is a timing diagram for illustrating the layer jump operation of the DVD system of FIG. 1.
Figure 3:
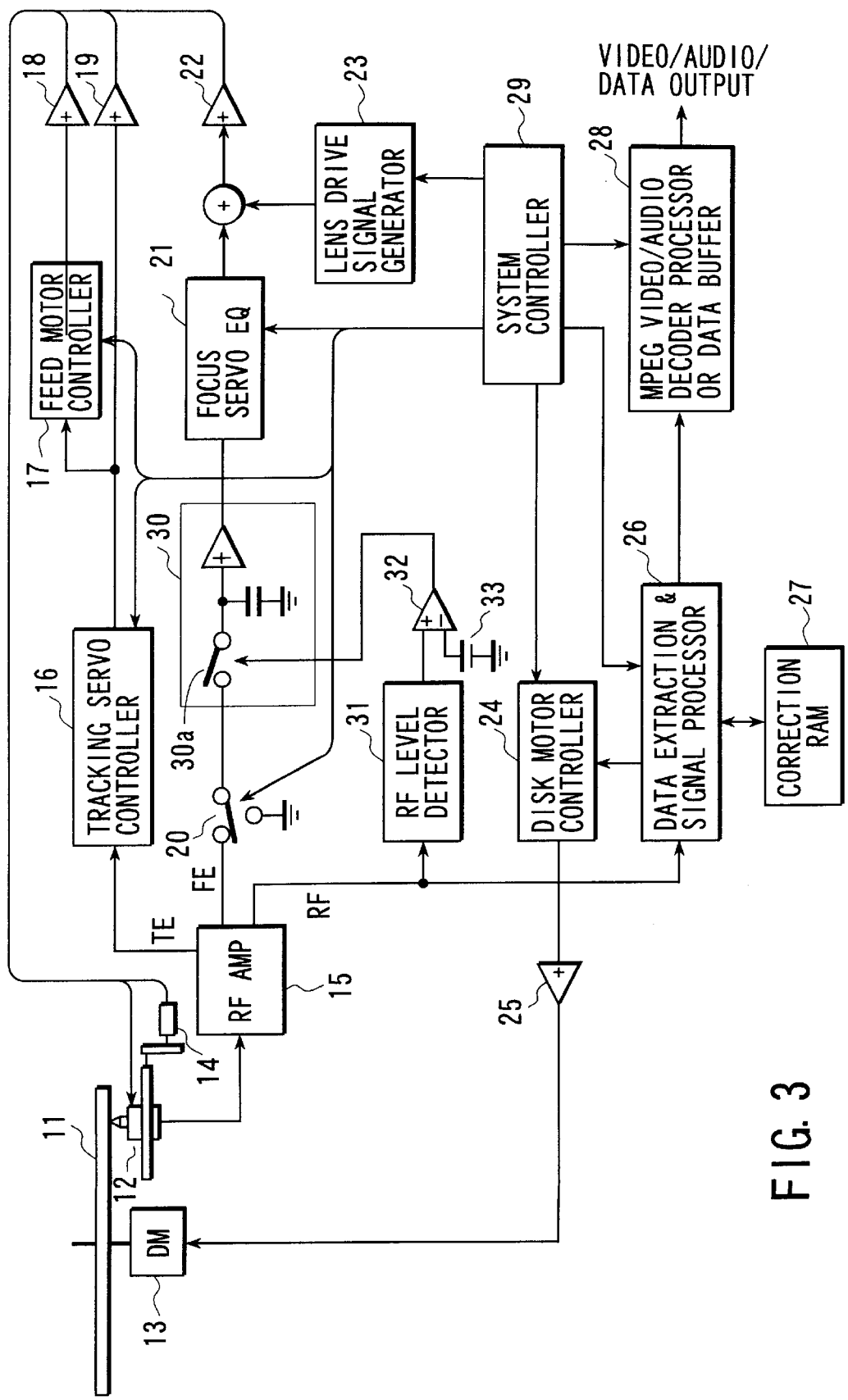
FIG. 3 is a block diagram showing a DVD system according to a first embodiment of this invention.
Figure 4:
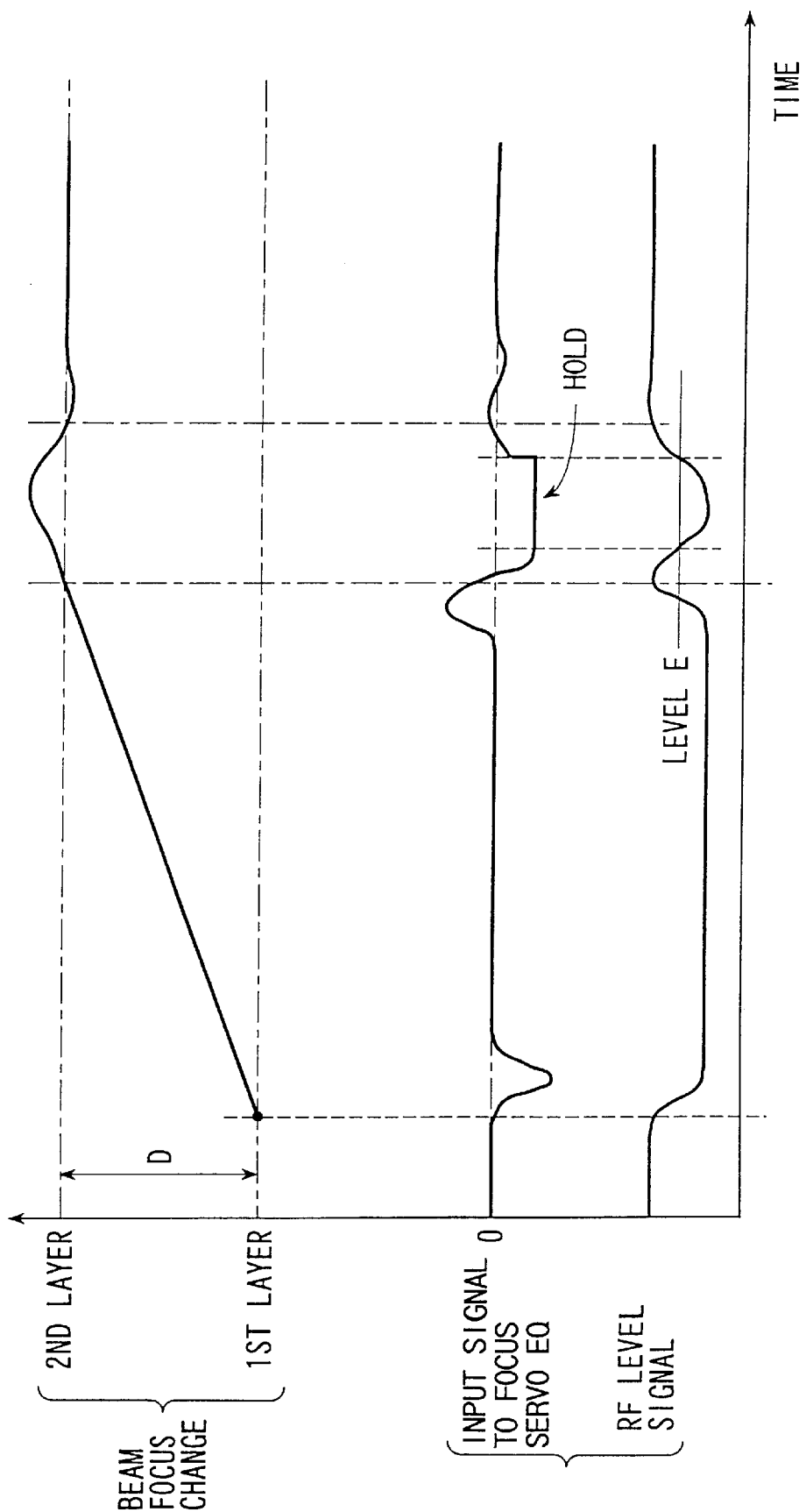
FIG. 4 is a timing diagram for illustrating the layer jump operation of the DVD system of FIG. 3.

FIG. 3 is a block diagram showing a DVD system according to a first embodiment of this invention and FIG. 4 is a timing diagram for illustrating the layer jump operation of the DVD system.

A signal read out from a disk 11 by use of a pickup 12 is input to an RF amplifier 15 and a tracking error signal TE, focus error signal FE and RF signal which is an information (data) signal are derived from the RF amplifier 15.

The tracking error signal TE is input to a tracking servo control circuit 16, the gain and phase thereof are compensated for and the seek control or the like is effected. An output signal of the tracking servo control circuit 16 is input to an actuator driver 19 to drive the tracking actuator of the pickup 12.

Further, an output signal of an output equalizer of the tracking servo control circuit 16 is also supplied to a feed motor control circuit 17 to drive a feed motor 14 via a motor driver 18.

The focus error signal FE is input to a focus servo equalizer (focus position correcting circuit) 21 via a servo ON/OFF switch 20 and a sample-hold circuit 30. An output signal of the focus servo equalizer 21 is added to a generation signal of a lens drive signal (jump signal) generating circuit 23 and the result of addition is supplied to a focus actuator driver 22. Then, it is supplied to drive the focus actuator of the pickup 12.

The RF signal is supplied to a data extraction circuit and CD/DVD data signal processing circuit 26, binary-coded in the data extraction circuit, then demodulated after a bit clock and synchronizing signal are extracted, and subjected to the correction process by use of a correction RAM 27. The synchronizing signal is supplied to a disk motor control circuit 24 to control a disk motor 13 via a disk motor driver 25.

Data corrected in the data signal processing circuit 26 is supplied to an MPEG video decoder/audio decoder processing circuit 28 in the case of DVD movie and a video signal or audio signal is output from the circuit 28. In the case of DVD-ROM, output data from the data signal processing circuit 26 is supplied to a data buffer circuit 28 and data is output therefrom as digital data to a host personal computer or the like. A system controller 29 controls the control timings of the respective control circuits and the operation of the whole set.

The RF signal output from the RF amplifier 15 is input to an RF signal level detector 31 and an RF signal level which is an information signal is detected in the detector. As the detector 31, a circuit for detecting the amplitude of the RF signal is generally used. An output signal of the detector 31 is compared with a preset voltage of a voltage source 33 by a comparator 33.

The FE signal passes the servo ON/OFF switch 20 and is then supplied to the switch 3a of the sample-hold circuit 30. Connection/disconnection of the switch 3a of the sample-hold circuit 30 is controlled by an output signal of the comparator 32 and an output signal of the sample-hold circuit 30 is supplied to the focus servo equalizer 21.

FIG. 4 is a timing diagram for illustrating the layer jump operation of the DVD system. The focus servo equalizer 21 is interrupted by the switch 20 at a certain time and the lens starts to jump from the first layer towards the second layer by an acceleration voltage output from the lens drive signal generating circuit 23.

The focus servo equalizer 21 is turned ON again and starts the pull-in operation when the beam spot (approximately equal to the focus position of the beam) has reached the second layer, but the beam spot overruns to a relatively large extent by the influence of the surface deviation if the relative speeds between the beam spot and the disk surface are too high. As a result, the focus servo is almost turned OFF and the output level of the RF signal level detector circuit 31 is lowered and becomes lower than a level E. The level E is a value determined by the voltage source 33. If the level becomes lower than the level E, the sample-hold circuit 30 is operated to hold the level of the focus error signal FE.

By the above operation, the beam spot which tends to be separated apart from the target layer is returned to the target layer, the sample-hold operation is terminated when the RF level exceeds the level E, and the servo operation is concentrated on the target layer. As a result, the probability of success of the layer jump is increased and the layer jump with higher reliability can be attained.

Second Embodiment

Figure 5:
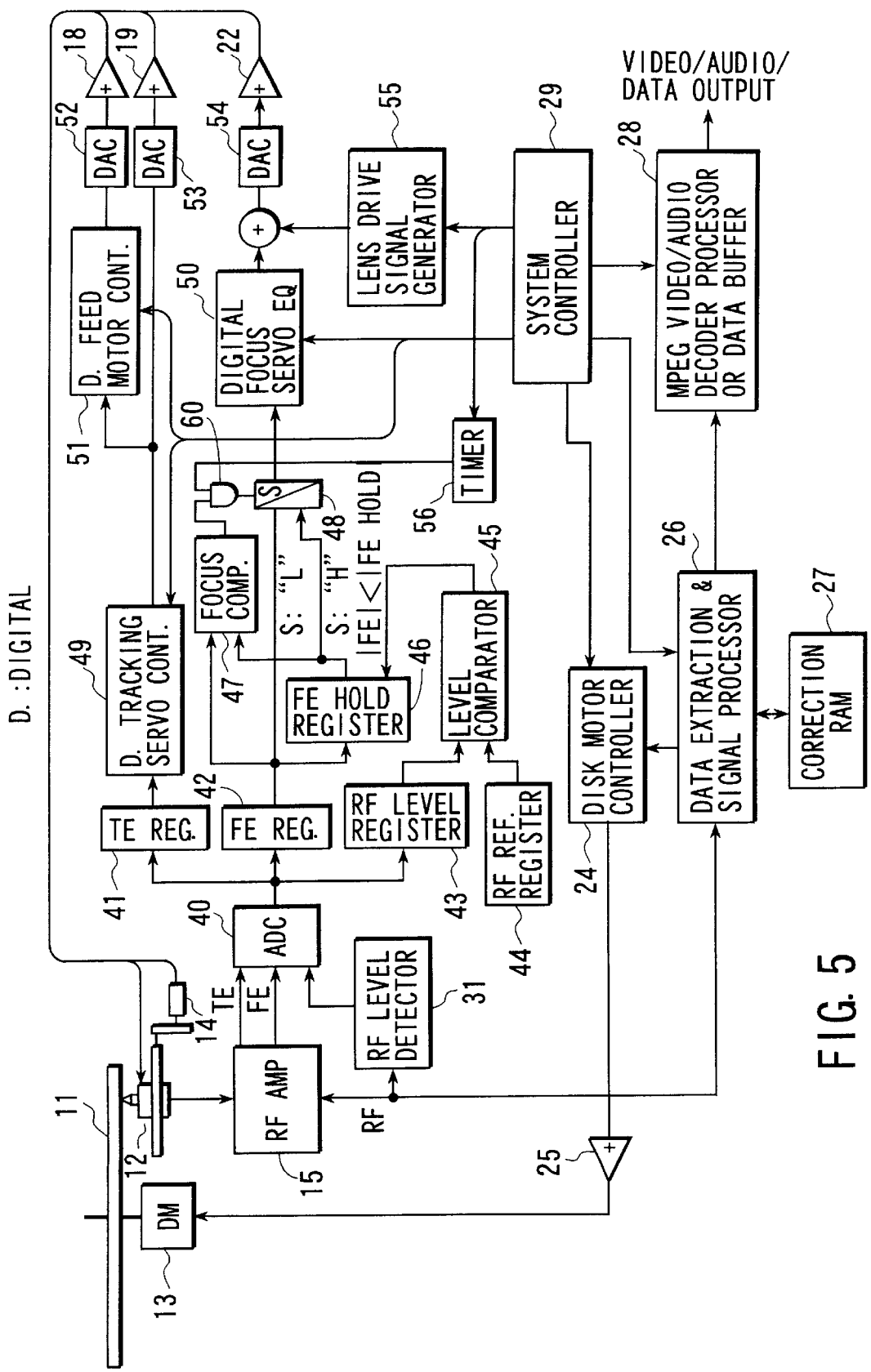
FIG. 5 is a block diagram showing a DVD system according to a second embodiment of this invention.
Figure 6:
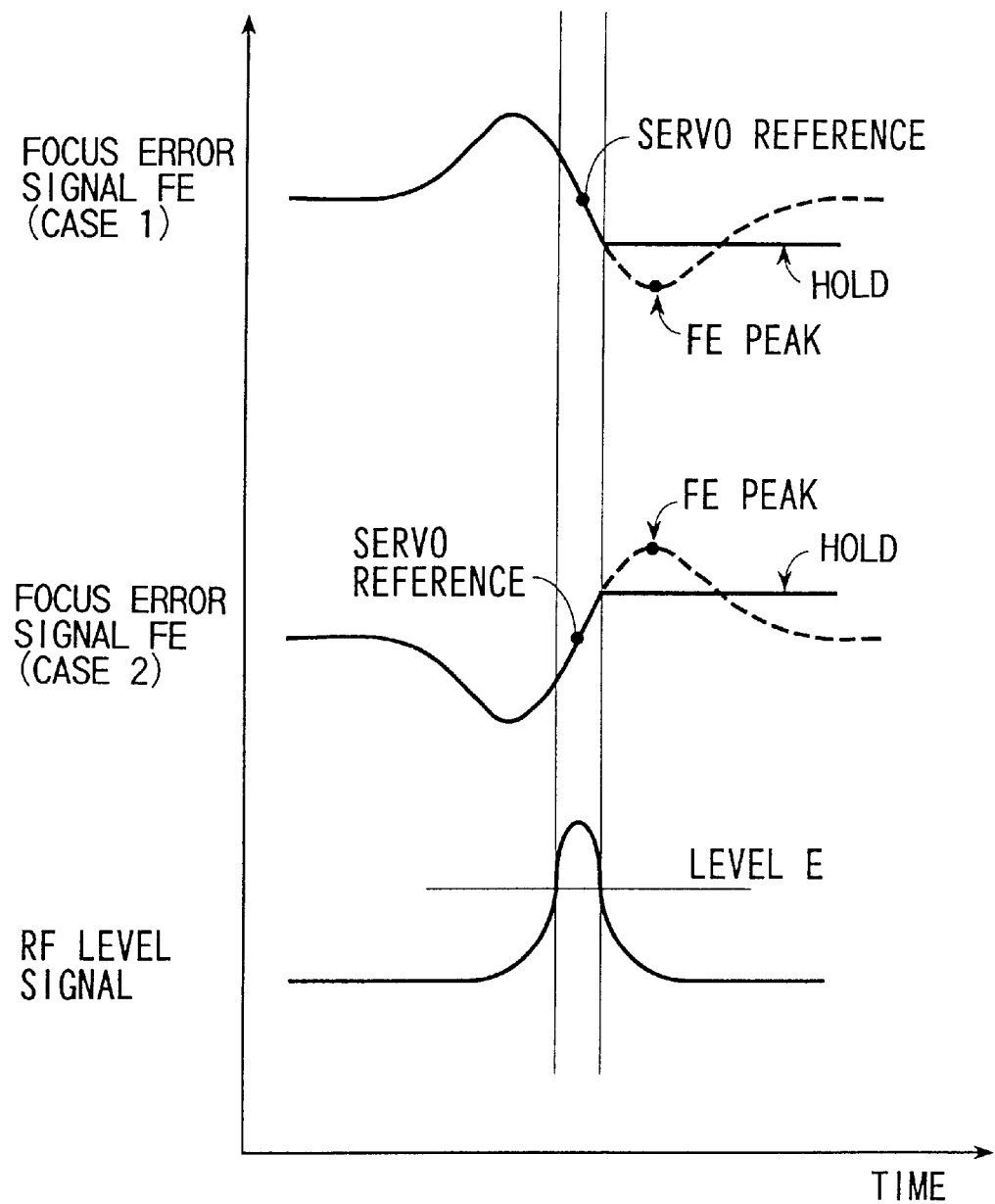
FIG. 6 is a timing diagram for illustrating the problem of an FE hold signal.
Figure 7:
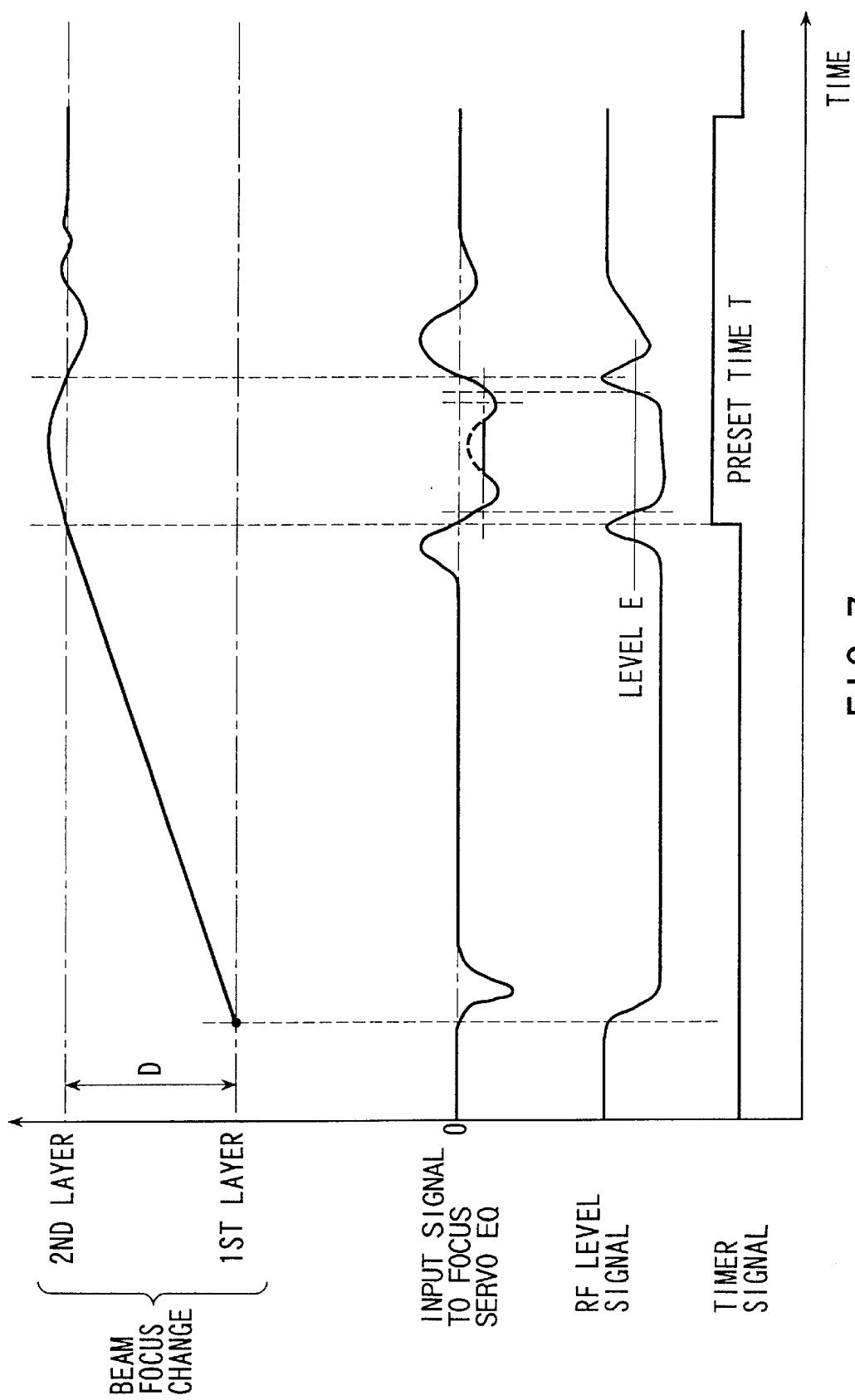
FIG. 7 is a timing diagram for illustrating the layer jump operation of the DVD system of FIG. 5.

FIG. 5 is a diagram of a system containing a focus servo control circuit of the DVD system which is a disk reproducing system, and FIGS. 6 and 7 are timing diagrams for illustrating the operation thereof. Since the basic construction of the disk reproducing system is the same as that of the system of FIG. 3, the focus servo control system is mainly explained. Further, portions which are the same as those of the first embodiment are denoted by the same reference numerals. This applies to the succeeding embodiments.

An electrical signal read out from a disk 11 by a pickup 12 is input to an RF amplifier 15 and a tracking error signal TE, focus error signal FE and RF signal which is used as an information signal are derived from the RF amplifier 15. The TE signal and FE signal are subjected to the analog-digital conversion in an analog-digital converter (ADC) 40. The RF signal is input to an RF signal level detector circuit 31 and an output thereof is AD-converted in the AD converter 40. The data items converted into the digital values are respectively latched in a TE register 41, FE register 42 and RF level register 43.

Data in the TE register 41 is supplied to a digital tracking servo control circuit 49. An output of the circuit 49 is converted to an analog value by a DA converter 53 and then supplied to an actuator driver 19. An output of the servo control circuit 49 is supplied to a digital feed motor control circuit 51, converted into an analog value by a DA converter 52 and supplied to a motor driver 18. An output of the actuator driver 19 is supplied to drive the tracking actuator (not shown) of the pickup 12 and an output of the driver 18 is supplied to drive a feed motor 14.

Focus error data latched in the FE register 42 is supplied to an FE hold register 46 and selector 48. A selector signal (input signal) of the selector 48 depends on an output signal of a level comparator 47.

That is, the level comparator 47 compares the absolute values of data of the FE register 42 and data of the FE hold register 46 with each other, outputs an "H" signal when the absolute value of data of the FE hold register 46 is larger, and the "H" signal is input to one input terminal of an AND gate 60 which receives an output signal of a timer circuit 56 at the other input terminal. When the output signal of the timer circuit 56 is at the "H" level, the input terminal S of the selector 48 is set to "H" so as to permit the data of the FE hold register 46 to be output from the selector 48.

The level comparator 47 outputs an "L" signal when the absolute value of data of the FE hold register 46 is equal to or smaller than the absolute value of data of the FE register 42. In this case, the output of the AND gate 60 becomes "L" and the selector 48 outputs data of the FE register 42.

The timer circuit 56 starts at the same time that the lens effects the layer jump and reaches the target layer and the servo mechanism is operated again. Then, it outputs an "H" signal for a preset period of time.

A digital value corresponding to the level E of FIG. 4 is set in an RF reference register 44. A level comparator 45 compares the outputs of the RF reference register 44 and the RF level register 43 with each other and selects one of the operation for holding data of the FE hold register 46 and the operation for outputting the result of the FE register 42 as it is. That is, when the value of the RF level register 43 becomes smaller than the value of the RF reference register 44, the value of the FE register 42 is held by the FE hold register 46.

An output of the selector 48 is supplied to a digital focus servo equalizer 50, an output of the equalizer 50 is added to an output signal of a lens drive signal generating circuit 55 prepared for performing the layer jump operation and the result of addition is converted into an analog value by a DA converter 54.

The RF signal is also supplied to the data extraction circuit and CD/DVD data signal processing circuit 26, binary-coded in the data extraction circuit, then demodulated after a bit clock and synchronizing signal are extracted, and subjected to the correction process by use of a correction RAM 27. The synchronizing signal is supplied to a disk motor control circuit 24 to control a disk motor 13 via a disk motor driver 25.

Data corrected in the data signal processing circuit 26 is supplied to an MPEG video/audio decoder processing circuit 28 in the case of DVD movie and a video signal or audio signal is output from the circuit 28. In the case of DVD-ROM, data output from the data signal processing circuit 26 is supplied to a data buffer 28 and data is output therefrom as digital data to a host personal computer or the like. A system controller 29 controls the control timings of the respective control circuits and the operation of the whole set.

FIGS. 6 and 7 are timing diagrams for illustrating the operation of the DVD system shown in FIG. 5. The relation between the focus error signal and the RF level signal is shown in FIG. 6 as the characteristic of a general pickup. In FIG. 6, CASE1 and CASE2 indicate cases wherein the polarity of the FE signal is different.

Since the RF level signal rises in level only in the central portion of an S-shaped curve of the focus error signal FE, the peak of the S-shaped curve of the focus error signal FE cannot be fully utilized if the FE signal is held at a point which is actually lowered from the level E. That is, the dynamic range of the focus error signal is narrowed. In order to improve this point, the system shown in FIG. 5 always compares the value of the FE hold register 46 with the value of the FE register 42 to select the value whose absolute value is larger as viewed from the servo reference.

The operation of the second embodiment is shown in FIG. 7. As shown in FIG. 7, at the time of layer jump, the lens overshoots after it has reached the second layer. At this time, the RF level is excessively lowered to a point which is lower than the level E, but the FE level is not immediately set to a value to be held and FE data is supplied to the digital focus servo equalizer 50 as it is.

After this, FE data is inverted and when it becomes smaller than the FE hold data as the absolute value, the FE hold data is used (output) instead of the FE data. Thus, the lens is returned to the target position. The timer signal becomes "H" when the lens first reaches the second layer, and after the passage of preset time, the timer signal becomes "L" to release the hold operation and restore the normal operation.

The timer circuit 56 is provided so as to effect the operation for settling the lens at the target layer within a preset period of time. The timer time T is set to 10 to 20 msec.

Figure 8:
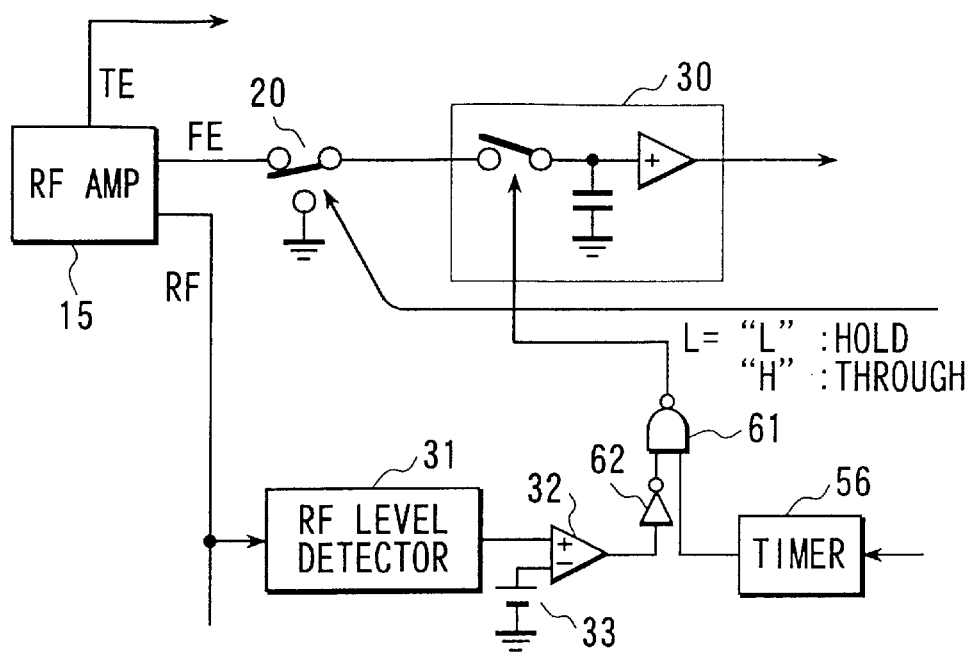
FIG. 8 is a block diagram showing an example in which a timer circuit is added to the first embodiment.

The timer circuit in this invention can be applied to the first embodiment. Further, the timer circuit can be incorporated into a portion different from the position of the second embodiment. In FIG. 8, the timer circuit 56 is incorporated into the analog DVD system shown in FIG. 3. The timer signal is input between the sample-hold circuit 30 and the comparator 32. That is, a logic circuit constructed by a NAND circuit 61 and an inverter 62 connected to one input terminal of the NAND circuit 61 is provided and an output terminal of the NAND circuit 61 is connected to the sample-hold circuit 30. One input terminal of the NAND circuit 61 is connected to the comparator 32 via the inverter 62 and the other input terminal thereof is connected to the timer circuit 56. When the timer output is "H", the sample-hold operation becomes effective.

Figure 9:
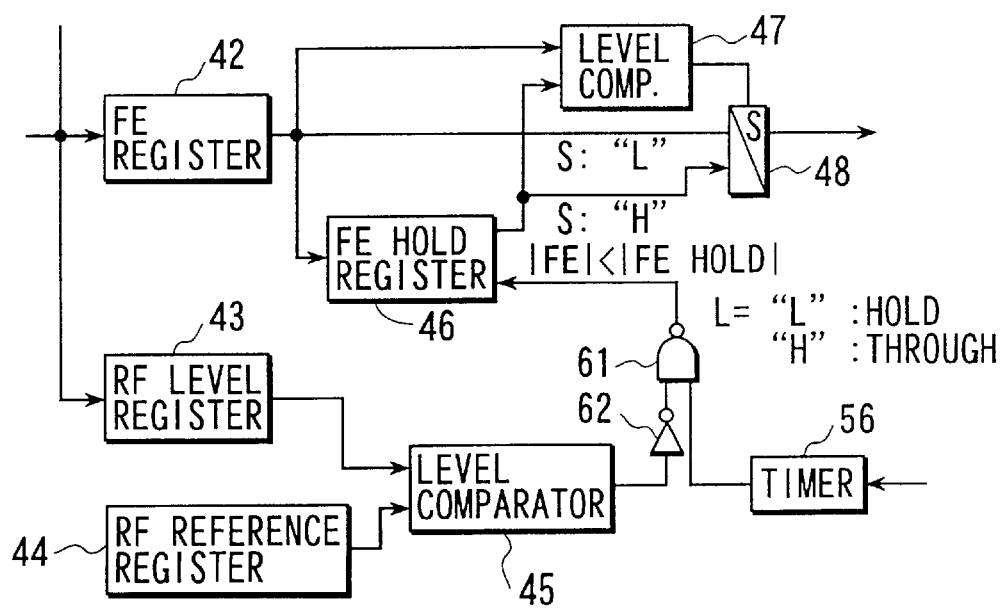
FIG. 9 is a block diagram showing a modification of the timer circuit in the second embodiment.

In FIG. 9, the timer circuit 56 is incorporated into the digital DVD system shown in FIG. 5 in a different configuration. The timer signal is input between the level comparator 45 and the FE hold register 46. That is, a logic circuit constructed by a NAND circuit 61 and an inverter 62 connected to one input terminal of the NAND circuit is provided and an output terminal of the NAND circuit 61 is connected to the FE hold register 46, one input terminal of the NAND circuit 61 is connected to the level comparator 45 via the inverter 62 and the other input terminal thereof is connected to the timer circuit 56. When the timer output is "H", the sample-hold operation becomes effective.

Third Embodiment

Figure 10:
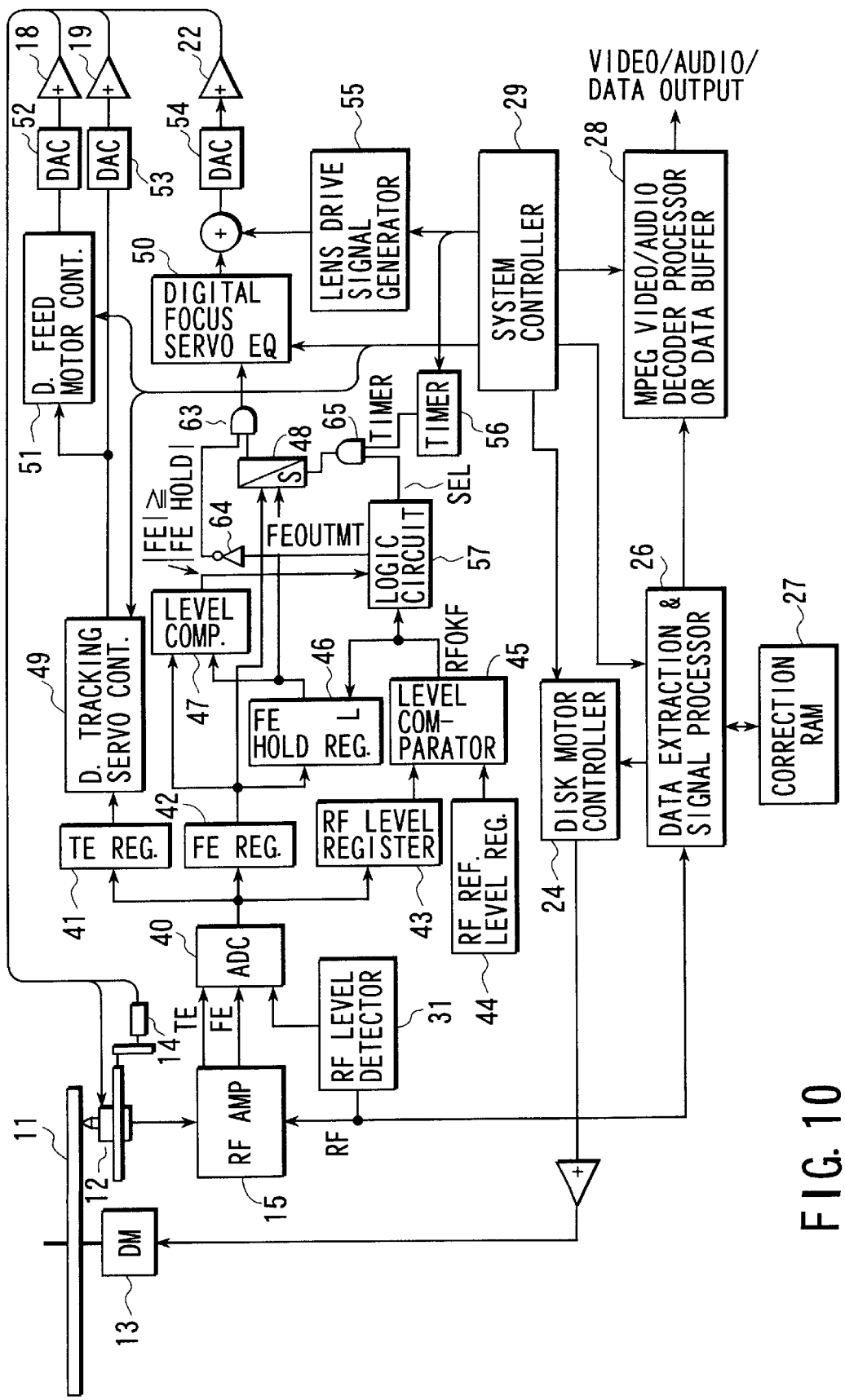
FIG. 10 is a block diagram showing a DVD system according to a third embodiment of this invention.

FIG. 10 is a block diagram showing a disk reproducing system according to a third embodiment of this invention. In the third embodiment, the operation speed of the lens is lowered by lowering the acceleration voltage when the lens is returned to the target player by a voltage held (when the acceleration voltage is applied while it lies in the upper position or the lower position). Therefore, a stable focus servo control system in which the vibration occurring near the target layer is suppressed can be attained.

More specifically, output signals of the tracking error signal TE, the focus error signal FE, RF signal level detector 31 are AD-converted by an AD converter 40 and data items converted into digital values are respectively latched into TE register 41, FE register 42, RF register 43. Data in the TE register 41 is supplied to a digital tracking servo control circuit 49 whose output signal is converted into an analog value by a DA converter 53 and then supplied to a driver 19.

An output signal of the servo control circuit 49 is also supplied to a digital feed motor control circuit 51 whose output signal is converted into an analog value by a DA converter 52 and then supplied to a motor driver 18.

Focus error data latched in the FE register 42 is supplied to a selector 48 together with data held in a FE hold register 46. A select signal of the selector 48 is selected based on the logical AND of an output signal SEL of a logic circuit 57 and an output signal TIMER of a timer circuit 56. The timer circuit 56 limits the FE hold operation time in this invention, and the timer is constructed to start at the same time that the lens reaches the target layer and that the servo operation is started again at the time of layer jump. Then, the timer outputs an "H" level signal for a preset period of time.

A level comparator 47 compares the absolute values of data of the FE register and data of the FE hold register 46 with each other and selects data whose absolute value is larger. That is, the level comparator 47 outputs an "H" level signal when |FE|≧|FE HOLD|. The result of comparison by the level comparator 47 is input to a logic circuit 57. Further, the logic circuit 57 is supplied with an output result RFOKF of an RF level comparator 45.

A digital value corresponding to the level E of FIG. 4 is set in an RF reference register 44. Output signals of the RF reference register 44 and RF level register 43 are supplied via the level comparator 45 and logic circuit 57 to create a signal SEL for selecting the operation for permitting the FE hold register 46 to effect the hold operation or the operation for permitting the result of the FE register 42 to be output as it is.

An output signal of the selector 48 is supplied to a digital focus servo equalizer 50 via an AND gate 63. An output signal of the digital focus servo equalizer 50 is added to an output signal of a lens drive signal generating circuit 55 prepared for effecting the layer jump and the result of addition is converted into an analog value by a DA converter 54.

Figure 11:
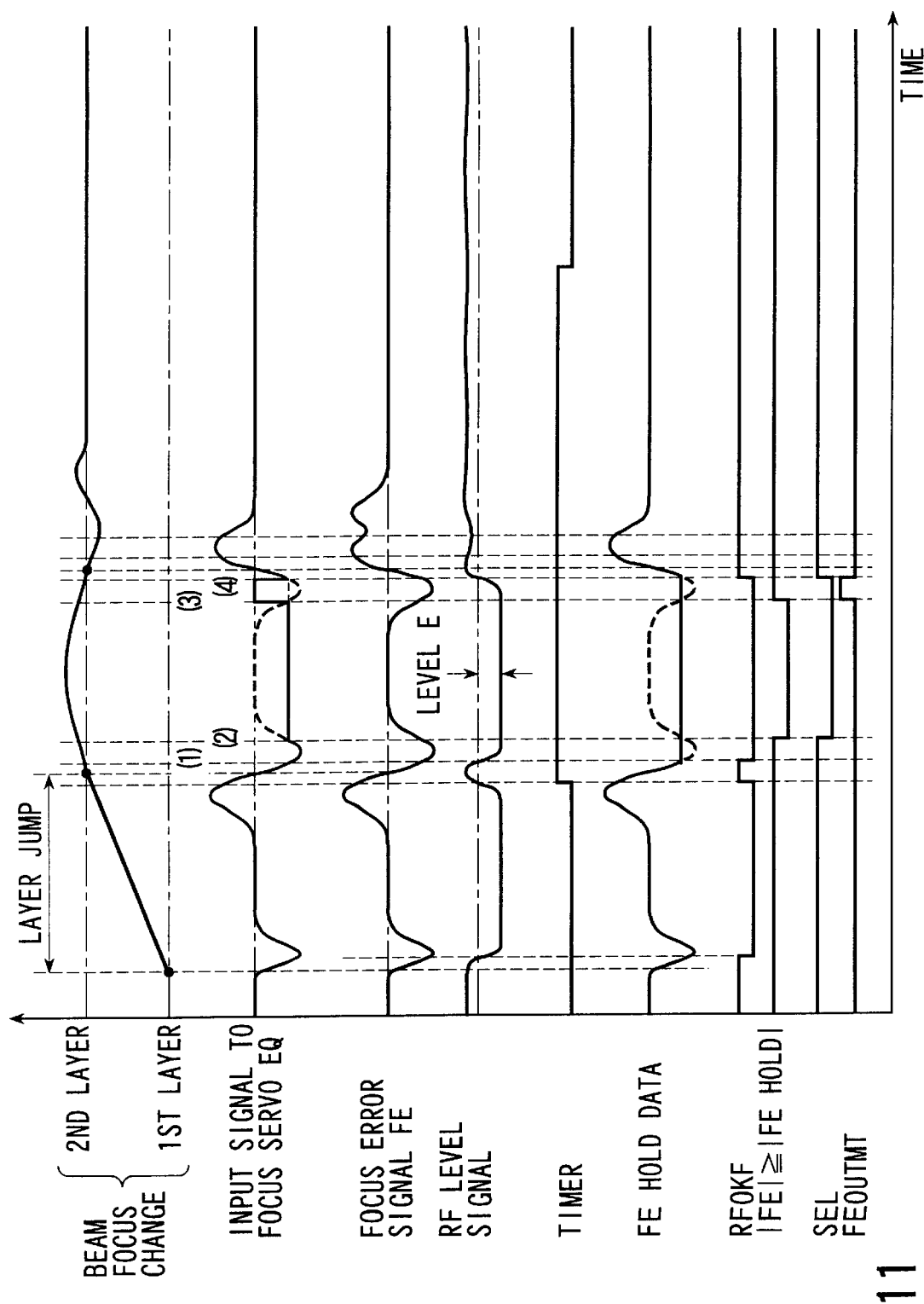
FIG. 11 is a timing diagram for illustrating the layer jump operation of the DVD system of FIG. 10.

FIG. 11 is a timing chart for illustrating the operation of the circuit shown in FIG. 10. As is clearly understood from FIG. 11, after the lens performs the layer jump operation and reaches the second layer, the lens overshoots. At this time, the RF level signal is excessively lowered to a point (1) which is lower than the level E. An FE level input to the focus servo equalizer 50 does not immediately become a value to be held and is supplied to the digital focus servo equalizer 50 as it is. After this, at a point (2) (which is a point at which the absolute value of FE data becomes smaller than the absolute value of FE hold data) at which the signal is excessively changed in the opposite direction, the SEL signal is set to the "L" level. Then, the FE hold data is input to the focus servo equalizer 50.

Next, the lens temporarily passes the target layer, but it is returned by the FE signal held. At a point (3) at which the lens approaches the target layer again and the FE signal starts to appear and exceeds the level held, an FEOUTMT from the logic circuit 57 is set to the "H" level and data (input signal to the focus servo equalizer 50) selected by the selector 48 is set to a correction signal "0" by an inverter 64 and AND gate 63.

In this case, the acceleration signal from below is set to "0" and the acceleration is reduced. Then, at a point (4) at which the lens approaches the target layer by inertia and the RF level exceeds the level E, an RFOKF signal is set to the "H" level, original FE data is input to the focus servo equalizer 50, and the normal servo pull-in operation is effected. At this time, since the lens is cut off from the acceleration signal from below, it is relatively decelerated. After this, the lens can be converged on the second layer only by the original pull-in ability of the servo system.

After the passage of preset time, the TIMER signal is set to the "L" level, the hold operation is released, and the normal operation is effected.

Fourth Embodiment

Figure 12:
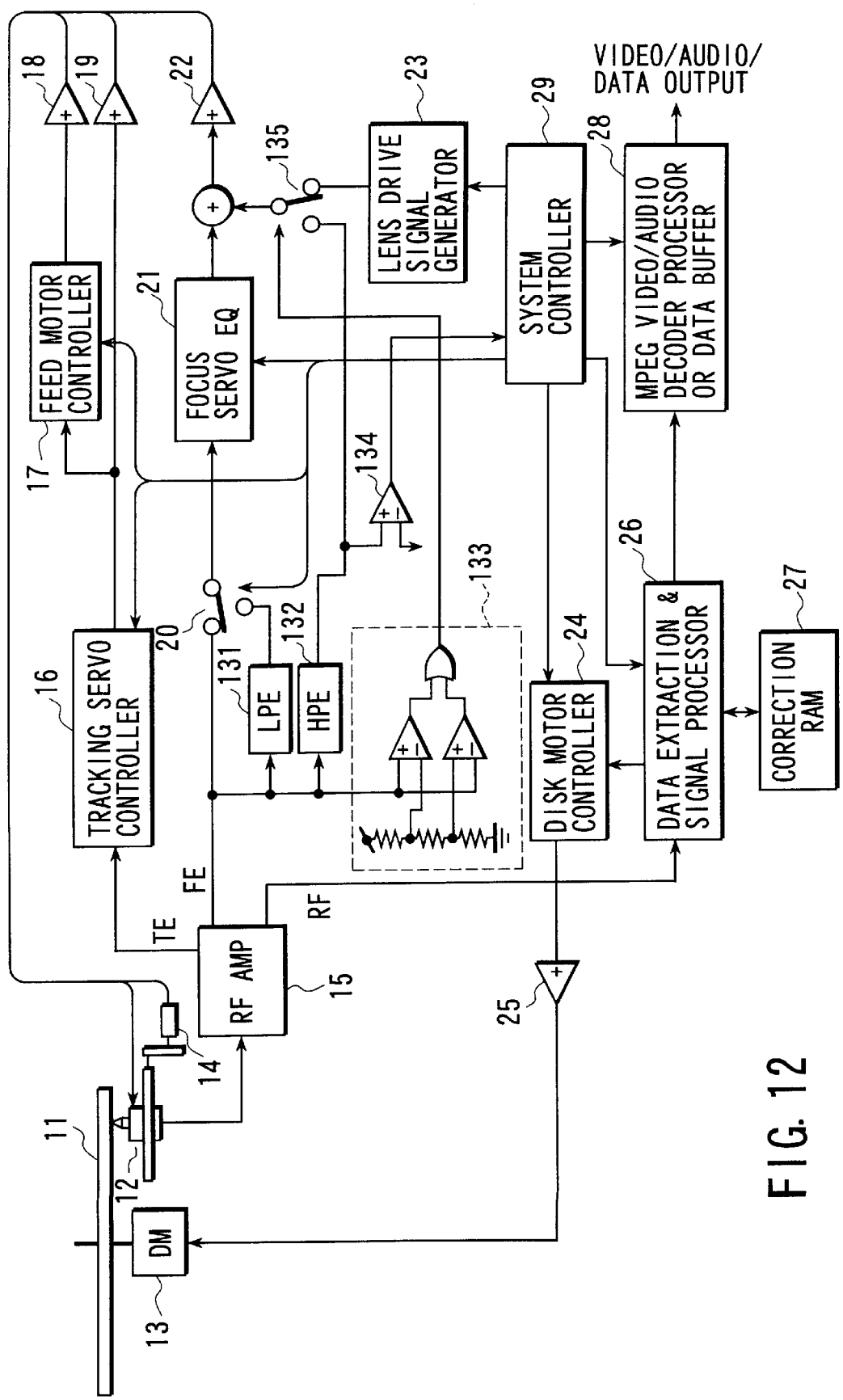
FIG. 12 is a block diagram showing a DVD system according to a fourth embodiment of this invention.
Figure 13:
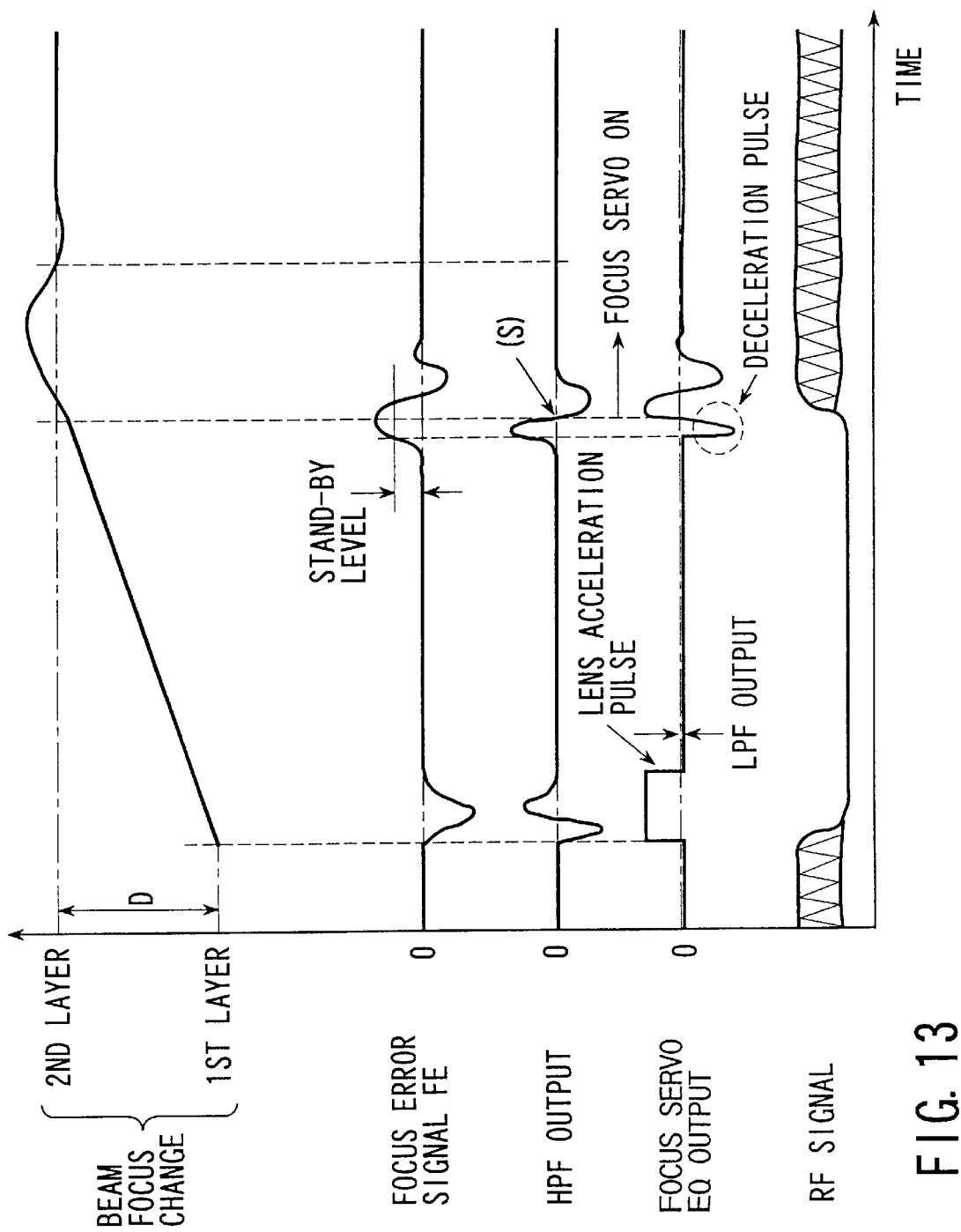
FIG. 13 is a timing diagram for illustrating the layer jump operation of the DVD system of FIG. 12.

FIG. 12 is a block diagram showing a DVD system according to a fourth embodiment of this invention, and FIG. 13 is a timing diagram for illustrating the layer jump operation of the DVD system of FIG. 12.

A focus error signal FE is input to a focus servo equalizer 21 via a servo ON/OFF switch 20. An output signal of the focus servo equalizer 21 is added to an output signal of a lens drive signal generating circuit 23 supplied via a switch 135 and the result of addition is supplied to a focus actuator driver 22. An output signal of the focus actuator driver 22 is supplied to drive the focus actuator of a pickup 12.

An FE signal output from an RF amplifier 15 is input to a low-pass filter (LPF) 131, high-pass filter (HPF) 132 and window comparator 133. The window comparator 133 includes two comparators and an OR circuit having two input terminals for receiving output signals of the two comparators. An output signal of the LPF 131 is supplied to the focus servo equalizer 21 when selected by the switch 20 instead of the FE signal.

An output signal of the high-pass filter (HPF) 132 is supplied to a polarity comparator 134 and the servo ON timing is created in a system controller 29. One of output signals of the high-pass filter 132 and lens drive signal generating circuit 23 is selected by a switch 135 according to an output signal of the window comparator 133. The signal becomes a lens acceleration signal or deceleration signal necessary for performing the layer jump operation. The signal is added to the output signal of the focus servo equalizer 21 and the result of addition is supplied to the focus actuator driver 22 to drive the focus lens. The switching position of the switch 135 is selected by the output signal of the window comparator 133. The window comparator 133 compares the FE signal with a preset level and detects that the FE signal exceeds the preset level.

FIG. 13 is a timing diagram for illustrating the operation of the fourth embodiment. The input terminal of the focus servo equalizer 21 is switched from the point of the first layer and connected to the output terminal of the low-pass filter (LPF) 131 which is an integrating circuit by the switch 20. This operation is effected to hold the lens position corresponding to the disk position changing at each time according to the surface deviation.

After this, the lens starts to jump towards the second layer by an acceleration voltage output from the lens drive signal generating circuit 23. When the beam spot approaches the second layer, the FE signal starts to appear. When it reaches the standby level determined by the window comparator 133, the switching position of the switch 135 is switched, the output signal of the high-pass filter (HPF) 132 which is a differentiating circuit is added to the output signal of the focus servo equalizer 21 and the result of addition is supplied to the focus actuator driver 22. That is, a deceleration pulse is input to the focus servo. The adding polarity of the signal of the high-pass filter (HPF) 132 must be set so as to add the signal in the brake direction of the lens.

Then, during the deceleration, the focus servo is turned ON again and the pull-in operation is started at an S point (zero cross point) at which the output signal of the polarity comparator 134 is inverted. After this, the output signal of the focus servo equalizer 21 is input to the driver 22 and the movement to the second layer is completed.

The focus error signal FE is positional information and a speed signal (that is, a differential signal of the focus error signal) is output from the LPF 131 based on the above information. The speed signal has a function of settling the target speed within a preset range.

The operation can be effected by use of the same algorithm in the case of the movement from the second layer to the first layer. By this operation, the accuracy of layer jump is enhanced and the layer jump with higher reliability can be attained.

Fifth Embodiment

Figure 14:
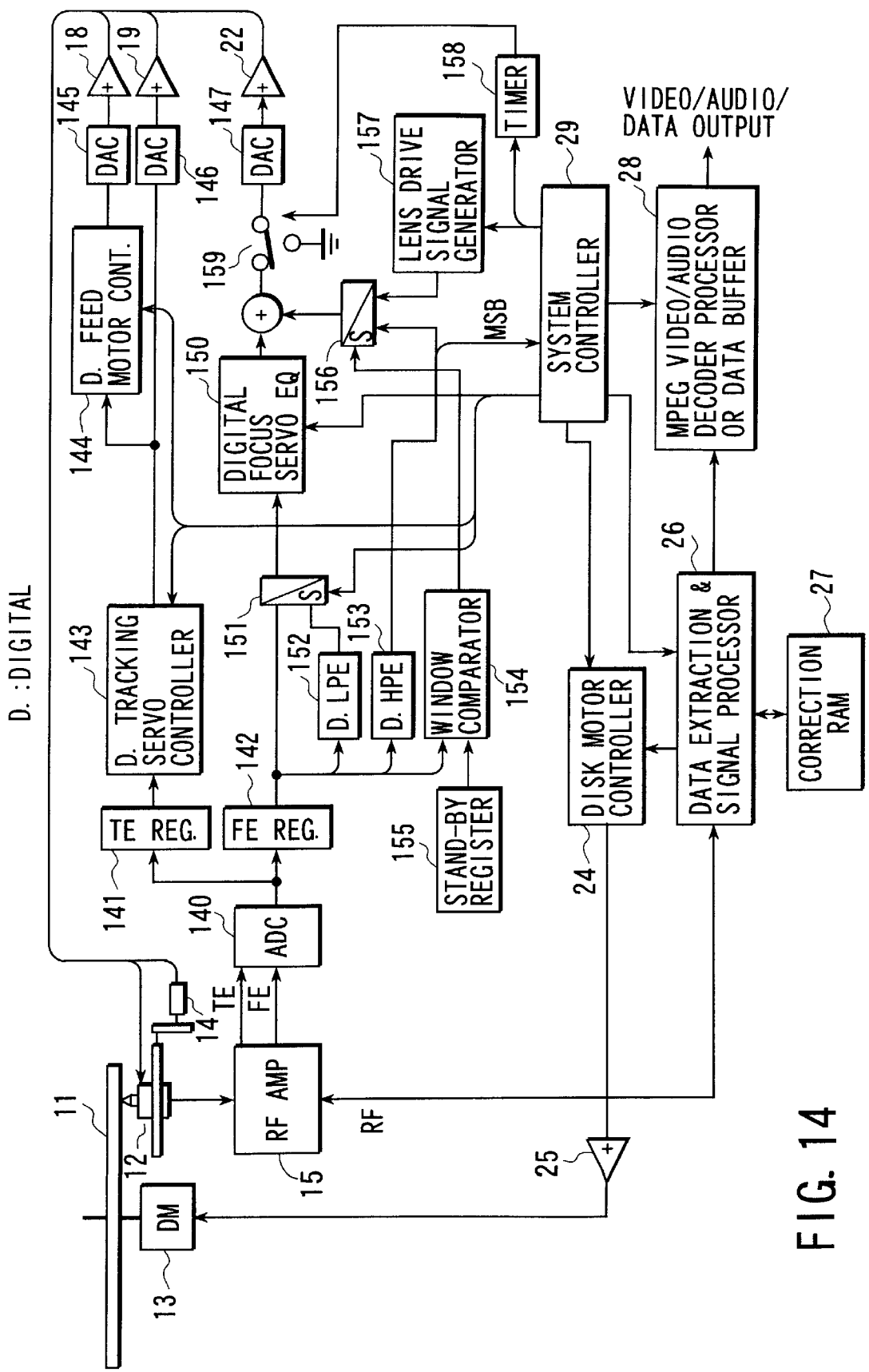
FIG. 14 is a block diagram showing a DVD system according to a fifth embodiment of this invention.
Figure 15:
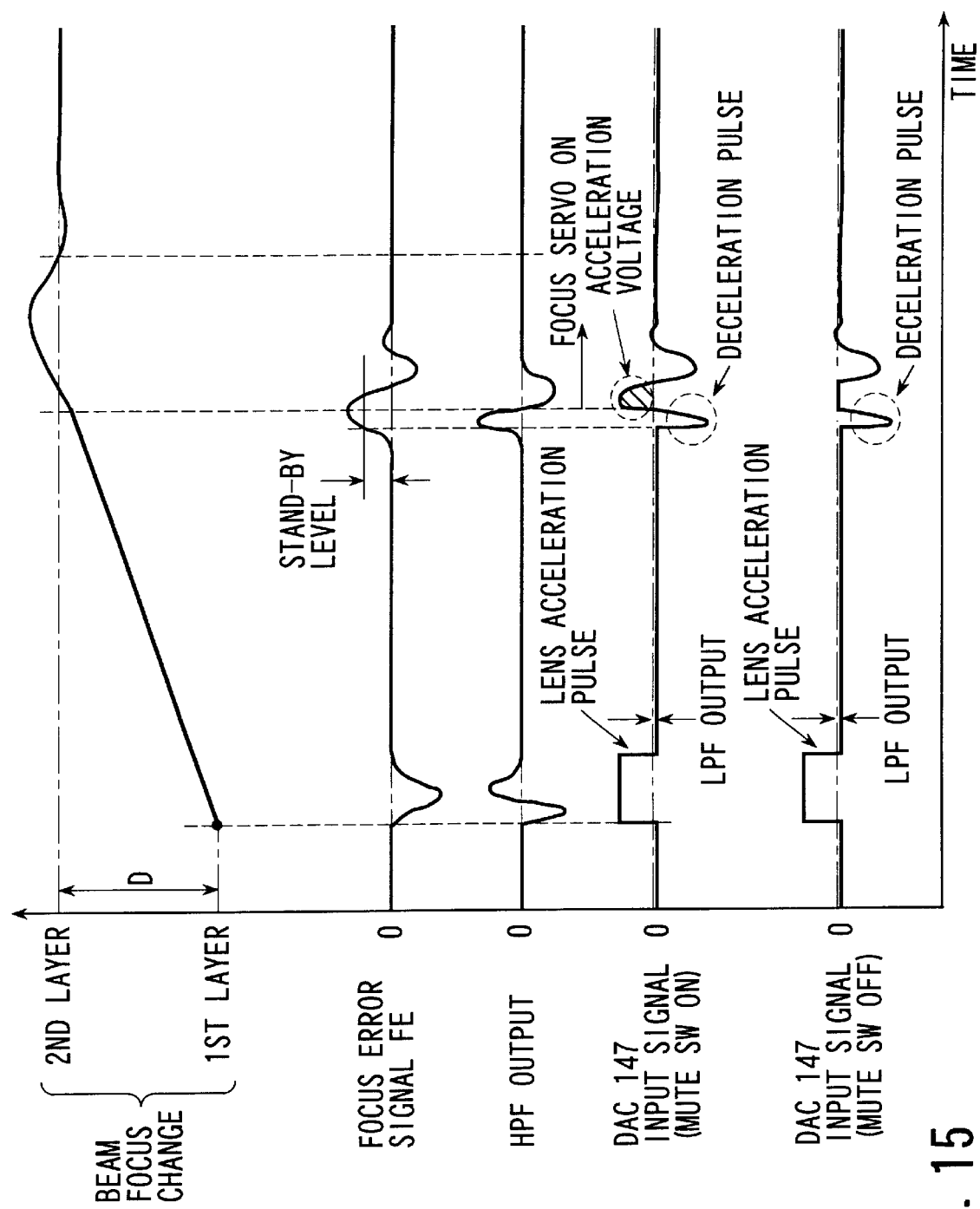
FIG. 15 is a timing diagram for illustrating the layer jump operation of the DVD system of FIG. 14.

FIG. 14 is a system diagram containing a focus servo control circuit of a DVD system according to a fifth embodiment of this invention, and FIG. 15 is a timing diagram for illustrating the operation thereof.

An electrical signal read out from a disk 11 by a pickup 12 is input to an RF amplifier 15 and a tracking error signal TE, focus error signal FE and RF signal which is used as an information signal are derived from the RF amplifier 15. The TE signal and FE signal are subjected to the analog-digital conversion in an analog-digital converter (ADC) 140. Data items converted into the digital values are latched in a TE register 141 and FE register 142.

Data in the TE register 141 is supplied to a digital tracking servo control circuit 143. An output of the circuit 143 is converted to an analog value by a DA converter 146 and then supplied to an actuator driver 19. An output of the servo control circuit 143 is supplied to a digital feed motor control circuit 144, converted into an analog value by a DA converter 145 and supplied to a motor driver 18. An output of the actuator driver 19 is supplied to drive the tracking actuator (not shown) of the pickup 12 and an output of the motor driver 18 is supplied to drive a feed motor 14.

Focus error data latched in the FE register 142 is supplied to a digital low-pass filter (LPF) 152, digital high-pass filter (HPF) 153 and window comparator 154. An output signal of the low-pass filter (LPF) 152 is supplied to a digital focus servo equalizer 150 when selected by a selector 151 instead of data of the FE register 142. A polarity bit MSB of the high-pass filter (HPF) 153 is supplied to a system controller 29 to create a servo ON timing signal. One of an output signal of a lens drive signal generating circuit 157 and the output signal of the high-pass filter (HPF) 153 is selected by a selector 156 according to the result of comparison of the window comparator 154.

The selected signal becomes a lens acceleration signal or deceleration signal necessary for performing the layer jump operation. The signal is added to the output signal of the digital focus servo equalizer 150 and the result of addition is supplied to a mute switch 159 and converted into an analog signal in a DA converter 147 and the analog signal is supplied to a driver 22. An output signal of the driver 22 is supplied to drive the focus lens of the pickup 12. The selector 156 is switched by the output signal of the window comparator 154. The window comparator 154 compares the absolute value of data of the FE register 142 with a preset level previously set in a standby register 155, detects that the FE signal exceeds the preset level, and switches the selector 156 to select the output signal of the high-pass filter (HPF) 153 instead of the output signal of the lens drive signal generating circuit 157.

FIG. 15 is a timing diagram for illustrating the operation of the fifth embodiment. The input terminal of the focus servo is switched from the point of the first layer and connected to the output terminal of the low-pass filter (LPF) 152 by the selector 151. This operation is effected to hold the lens position corresponding to the disk position changing at each time according to the surface deviation.

After this, the lens starts to move towards the second layer by an acceleration voltage output from the lens drive signal generating circuit 157. When the beam spot approaches the second layer, the FE signal starts to appear. When it reaches the standby level determined by the window comparator 154, the selecting position of the selector 156 is switched such that the output signal of the high-pass filter (HPF) 153 is added to the output signal of the focus servo equalizer 150, and the result of addition is supplied to the focus actuator driver 22 to apply the brake of the lens movement speed. The adding polarity of the signal of the high-pass filter (HPF) 153 must be set so as to add the signal in the brake direction of the lens. Then, when the polarity bit of the FE signal is inverted during the deceleration, the focus servo is turned ON again and the pull-in operation is started. After this, the output signal of the focus servo equalizer 150 is input to the driver 22.

However, a hatched portion in FIG. 15 indicates that a signal for accelerating the lens (having the same polarity as the acceleration signal) is again applied to the driver 22 by the output signal of the focus servo equalizer 150, although the lens is sufficiently decelerated so far. In order to prevent this, in the fifth embodiment, the mute switch 159 is made operative for time T0 corresponding to a preset period of time (during which an acceleration signal is output from the focus servo equalizer 150) immediately after the servo is made ON, so as to prevent the acceleration signal from being applied to the driver 22 (refer to the bottom portion of FIG. 15). T0 is time determined by the timer circuit 158. At this time, the output signal of the focus servo equalizer 150 eliminates the hatched portion in FIG. 15 and cancel the influence by this portion. After this, the movement to the second layer is completed.

The operation can be effected by use of the same algorithm in the case of the movement from the second layer to the first layer. By this operation, the accuracy of layer jump is enhanced and the layer jump with higher reliability can be attained.

Sixth Embodiment

Figure 16:
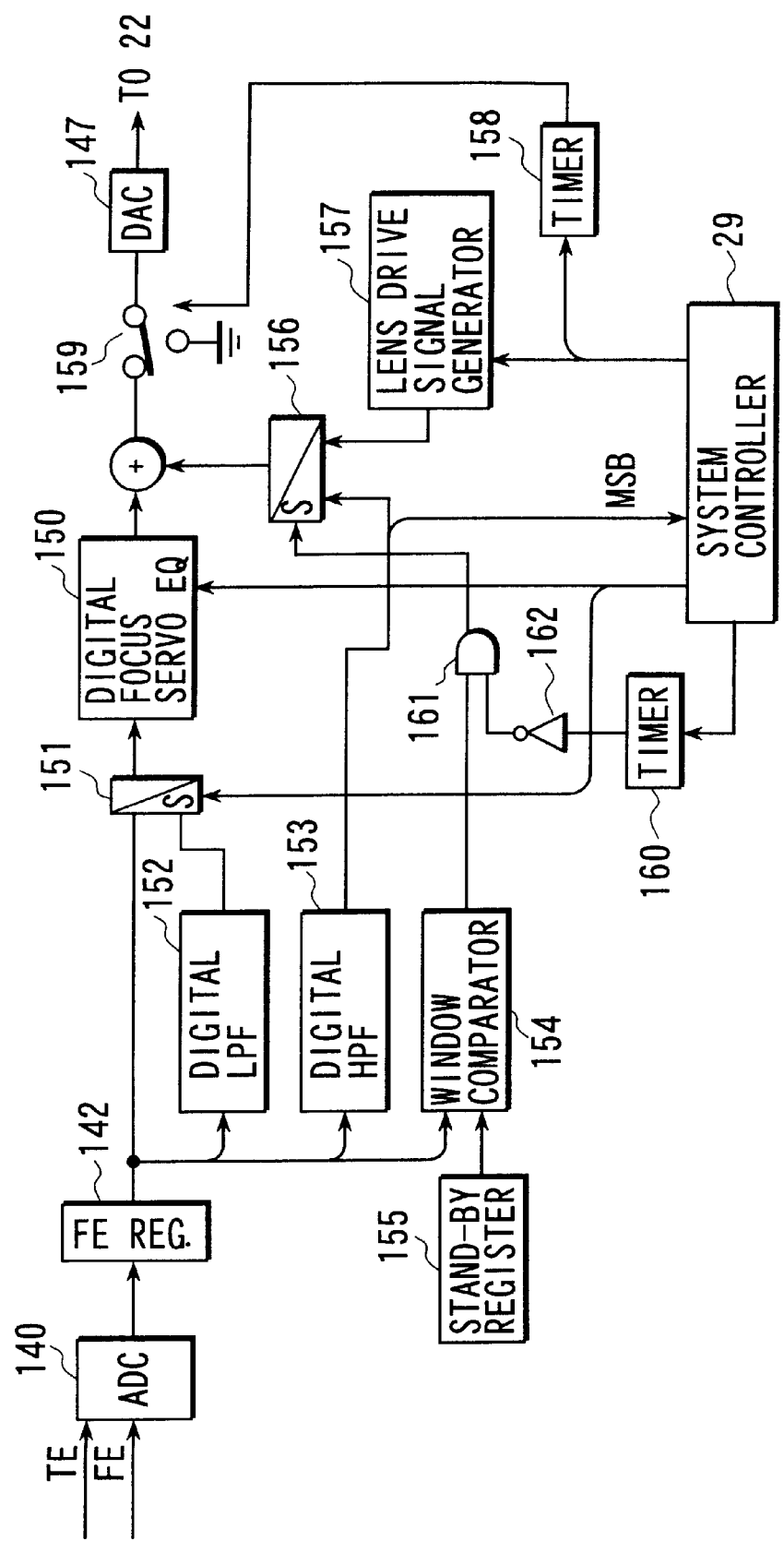
FIG. 16 is a block diagram showing a DVD system according to a sixth embodiment of this invention.
Figure 17:
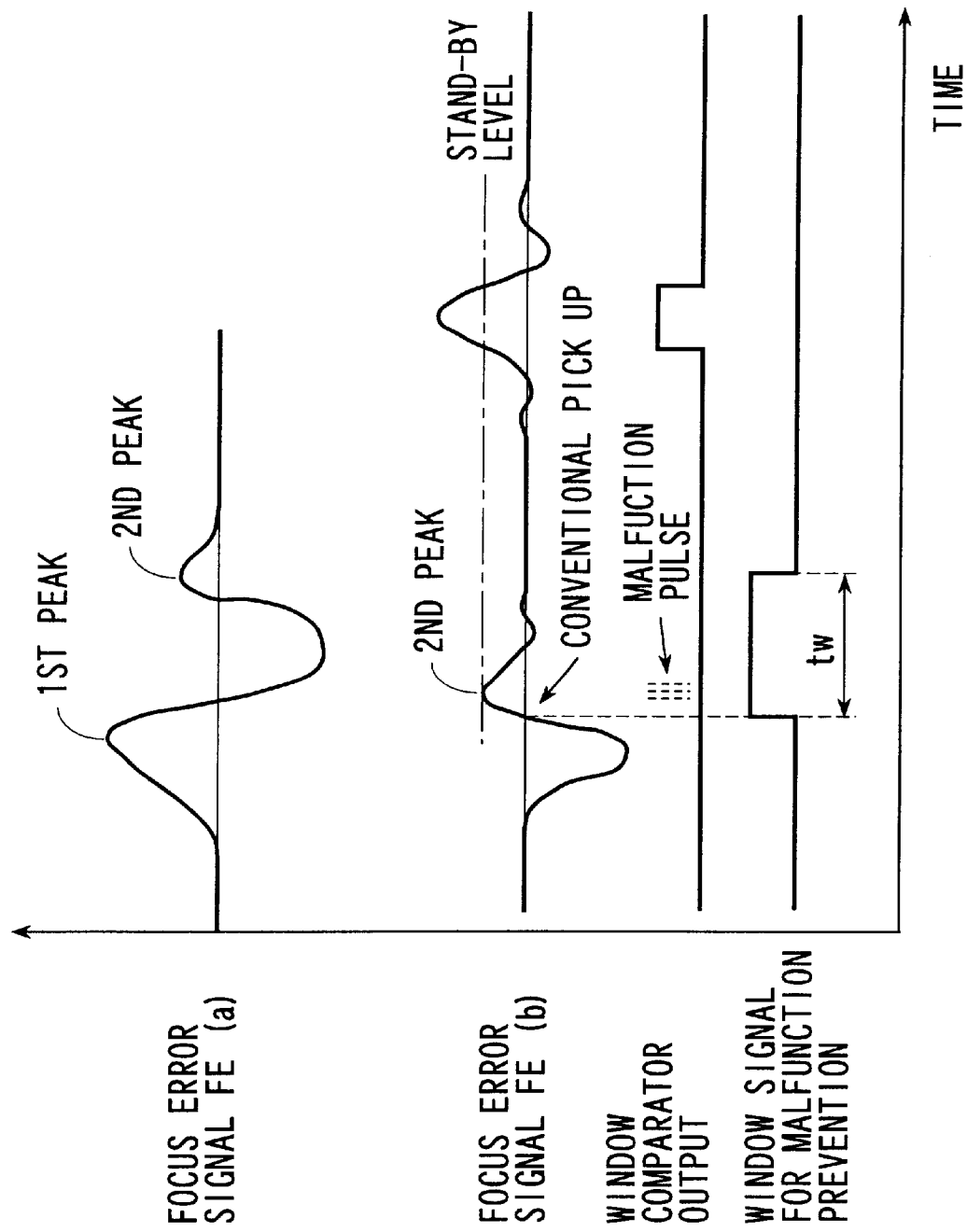
FIG. 17 is a timing diagram for illustrating the layer jump operation of the DVD system of FIG. 16.

FIG. 16 is a system diagram containing a focus servo control circuit of a DVD system according to a sixth embodiment of this invention, and FIG. 17 is a timing diagram for illustrating the operation thereof.

The sixth embodiment is basically the same system as the system of FIG. 14, but it has a feature that the output signal of the window comparator 154 is temporarily prevented from being input to the selector 156 by use of the timer circuit 160. That is, the selecting position of a selector 156 is switched by an output of a window comparator 154. The window comparator 154 compares the absolute value of data of an FE register 142 with a preset level previously set in a standby register 155, detects that the FE signal exceeds the preset level, and switches the selector 156 to select the output signal of the high-pass filter (HPF) 153 instead of the output signal of the lens drive signal generating circuit 157.

According to the system of FIG. 16, an AND circuit 161 is inserted between the window comparator 154 and the selector 156. One input terminal of the AND circuit 161 is connected to the output terminal of the window comparator 154, the other input terminal thereof is connected to a timer circuit 160 via an inverter 162, and an output terminal thereof is connected to the selection terminal of the selector 156. The timer circuit 160 is controlled by a system controller 29.

Among recent pickups, in addition to two-lens type pickups, pickups having one lens and two focuses and dealing with both of CD and DVD are widely used. However, the feature of the latter type of pickups is that the focus error signal FE tends to have two peak portions (refer to the FE signal (a) in FIG. 17). Therefore, in order to cope with the pickups, in this embodiment, the system of FIG. 14 is partly modified to attain the circuit of FIG. 16. That is, the timer circuit 160 is additionally provided on the output side of the window comparator 154 such that a select signal of the selector 156 is selected based on the logical AND of an output signal of the window comparator 154 and an output signal of the timer circuit 160.

The timer circuit 160 creates a gate signal (erroneous operation preventing window signal) at the same time as the start of layer jump. The gate signal is set at the "H" level for preset time tw. The gate time tw sets time necessary for the lens to escape from the present layer. By this operation, an erroneous operation is prevented even if the standby level is erroneously applied to the second small peak portion.

By additionally providing the timer circuit, the layer jump with higher reliability can be attained for a one-lens type pickup.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A focus servo control system for selectively applying a light beam to a disk on which data is recorded on plurally layered recording surfaces and focusing a focus position of the light beam on a selected one of the plurally layered recording surfaces based on a signal read from reflected light from the selected one of the plurally layered recording surfaces of the disk, comprising:

a focus error detector for detecting a positional difference between the focus position of the light beam and the selected one of the plurally layered recording surfaces;

a sample-hold circuit for sampling and holding an output of said focus error detector;

a focus position correcting circuit for correcting the focus position of the light beam based on one of the output of said focus error detector and an output of said sample-hold circuit;

a data signal level detector for detecting a signal level relating to data read out from the disk;

a first comparator for comparing the signal level detected by said data signal level detector with a predetermined level to output a result of comparison; and a selector for selecting one of the output of said focus error detector and the output of said sample-hold circuit as an input signal of said focus position correcting circuit based on the output of said first comparator.

2. A focus servo control system according to claim 1, further comprising a timer circuit for setting a sample hold operation of said sample-hold circuit active for a preset period of time.

3. A focus servo control system according to claim 2, further comprising a control circuit for causing a start of the operation of said timer circuit and a start of an operation of said focus position correcting circuit to substantially coincide with each other.

4. A focus servo control system according to claim 1, further comprising a second comparator which compares an absolute value of the output of said focus error detector with an absolute value of the output of said sample-hold circuit, wherein said selector selects the output of said sample-hold circuit when the absolute value of the output of said sample-hold circuit is larger than the absolute value of the output of said focus error detector.

5. A focus servo control system according to claim 1, further comprising a correction signal generating circuit for generating a correction signal having an absolute value smaller than the absolute value of the output of said sample-hold circuit as the input signal of said focus position correcting circuit, wherein, in a case where the focus position of the light beam jumps from one recording surface to another recording surface of the plurally layered recording surfaces, the output of said focus error detector to said focus position correcting circuit is input in an initial stage of an overshooting period in which the focus position of the light beam passes through said another recording surface, the output of said sample-hold circuit to said focus position correcting circuit is input in an intermediate stage of the overshooting period in which the focus position of the light beam overshoots said another recording surface, and the output of said correction signal generating circuit to said focus position correcting circuit is input in a final stage of the overshooting period in which the focus position of the light beam enters said another recording surface again.

6. A disk reproducing system for selectively applying a light beam to a disk on which data is recorded on plurally layered recording surfaces and reproducing the data based on a signal read from reflected light from a selected one of the plurally layered recording surfaces of the disk, comprising:

a pickup for reading the reflected light;

a focus error detector for detecting a positional difference on a basis of the reflected light read by the pickup between a focus position of the light beam and the selected one of the plurally layered recording surfaces;

a sample-hold circuit for sampling and holding an output of said focus error detector;

a focus position correcting circuit for correcting the focus position of the light beam based on one of the output of said focus error detector and an output of said sample-hold circuit;

a data signal level detector for detecting a signal level relating to data read out from the disk;

a first comparator for comparing the signal level detected by said data signal level detector with a predetermined level to output a result of comparison; and a selector for selecting one of the output of said focus error detector and the output of said sample-hold circuit as an input signal of said focus position correcting circuit based on the output of said first comparator.

7. A disk reproducing system according to claim 6, further comprising a timer circuit for setting a sample hold operation of said sample-hold circuit active for a preset period of time.

8. A disk reproducing system according to claim 7, further comprising a control circuit for causing a start of the operation of said timer circuit and a start of an operation of said focus position correcting circuit to substantially coincide with each other.

9. A disk reproducing system according to claim 6, further comprising a second comparator which compares an absolute value of the output of said focus error detector with an absolute value of the output of said sample-hold circuit, wherein said selector selects the output of said sample-hold circuit when the absolute value of the output of said sample-hold circuit is larger than the absolute value of the output of said focus error detector.

10. A disk reproducing system according to claim 6, further comprising a correction signal generating circuit for generating a correction signal having an absolute value smaller than the absolute value of the output of said sample-hold circuit as the input signal of said focus position correcting circuit, wherein, in a case where the focus position of the light beam jumps from one recording surface to another recording surface of the plurally layered recording surfaces, the output of said focus error detector to said focus position correcting circuit is input in an initial stage of an overshooting period in which the focus position of the light beam passes through said another recording surface, the output of said sample-hold circuit to said focus position correcting circuit is input in an intermediate stage of the overshooting period in which the focus position of the light beam overshoots said another recording surface, and the output of said correction signal generating circuit to said focus position correcting circuit is input in a final stage of the overshooting period in which the focus position of the light beam enters said another recording surface again.

11. A focus servo control system for selectively applying a light beam to a disk on which data is recorded on plurally layered recording surfaces and focusing a focus position of the light beam on a selected one of the recording surfaces based on a signal read from reflected light from the selected one of the plurally layered recording surfaces of the disk, comprising:

a focus error detector for detecting a positional difference between the focus position of the light beam and the selected one of the plurally layered recording surfaces;

a focus position correcting circuit for correcting the focus position of the light beam based on an output of said focus error detector;

a system control circuit for controlling an operation of said focus position correcting circuit;

a differentiating circuit for outputting a high frequency component of the output of said focus error detector;

a comparator for comparing a level of the output of said focus error detector with a predetermined level to output an activation signal when the level of the output of said focus error detector exceeds the predetermined level;

a jump signal generating circuit controlled by said system control circuit, for generating a control signal for jumping the focus position of the light beam from one of the plurally layered recording surfaces to another of the recording surfaces;

a selector for selecting and outputting one of an output of said differentiating circuit and an output of said jump signal generating circuit based on an output of said comparator; and an adder for adding an output of said selector to an output of said focus position correcting circuit.

12. A focus servo control system according to claim 11, which further comprises an integrating circuit for outputting a low frequency component of the output of said focus error detector and in which said system control circuit switches the output of said focus error detector to an output of said integrating circuit as an input of said focus position correcting circuit and jumps the focus position of the light beam from the one of the plurally layered recording surfaces to said another of the recording surfaces by use of the control signal generated by said jump signal generating circuit, and, after said comparator outputs the activation signal and the output of said differentiating circuit is output to said adder, said system control circuit sets a position correcting operation of said focus position correcting circuit active when a polarity of the output of said differentiating circuit is inverted.

13. A focus servo control system according to claim 12, further comprising a mute circuit connected to an output side of said focus position correcting circuit, for interrupting the output of said focus position correcting circuit for a preset period of time after the polarity of the output of said differentiating circuit is inverted.

14. A focus servo control system according to claim 11, further comprising a gate circuit connected to said comparator, for interrupting the output of said comparator for a preset period of time immediately after a jumping operation is started when the focus position jumps from the one of the plurally layered recording surfaces to said another of the recording surfaces.

15. A focus servo control system according to claim 11, wherein said jump signal generating circuit outputs the control signal for a preset period of time immediately after a jumping operation is started when the focus position jumps from the one of the plurally layered recording surfaces to said another of the recording surfaces.

16. A disk reproducing system for selectively applying a light beam to a disk on which data is recorded on plurally layered recording surfaces and reproducing the data based on a signal read from reflected light from a selected one of the plurally layered recording surfaces of the disk, comprising:

a pickup for reading the reflected light;

a focus error detector for detecting a positional difference on a basis of the reflected light read by the pickup between focus position of the light beam and the selected one of the plurally layered recording surfaces;

a focus position correcting circuit for correcting the focus position of the light beam based on an output of said focus error detector;

a system control circuit for controlling an operation of said focus position correcting circuit;

a differentiating circuit for outputting a high frequency component of the output of said focus error detector;

a comparator for comparing a level of the output of said focus error detector with a predetermined level to output an activation signal when the level of the output of said focus error detector exceeds the predetermined level;

a jump signal generating circuit controlled by said system control circuit, for generating a control signal for jumping the focus position of the light beam from one of the plurally layered recording surfaces to another of the recording surfaces;

a selector for selecting and outputting one of an output of said differentiating circuit and an output of said jump signal generating circuit based an output of said comparator; and an adder for adding an output of said selector to an output of said focus position correcting circuit.

17. A disk reproducing system according to claim 16, which further comprises an integrating circuit for outputting a low frequency component of the output of said focus error detector and in which said system control circuit switches the output of said focus error detector to an output of said integrating circuit as an input of said focus position correcting circuit and jumps the focus position of the light beam from the one of the plurally layered recording surfaces to said another of the recording surfaces by use of the control signal generated by said jump signal generating circuit, and after said comparator outputs the activation signal and the output of said differentiating circuit is output to said adder, said system control circuit sets a position correcting operation of said focus position correcting circuit active when a polarity of the output of said differentiating circuit is inverted.

18. A disk reproducing system according to claim 17, further comprising a mute circuit connected to an output side of said focus position correcting circuit, for interrupting the output of said focus position correcting circuit for a preset period of time after the polarity of the output of said differentiating circuit is inverted.

19. A disk reproducing system according to claim 16, further comprising a gate circuit connected to said comparator, for interrupting the output of said comparator for a preset period of time immediately after a jumping operation is started when the focus position jumps from the one of the plurally layered recording surfaces to said another of the recording surfaces.

20. A disk reproducing system according to claim 16, wherein said jump signal generating circuit outputs the control signal for a preset period of time immediately after a jumping operation is started when the focus position jumps from the one of the plurally layered recording surfaces to said another recording surfaces.

* * * * *